(12) United States Patent (10) Patent No.: US 8,107,728 B2
Yamamoto et al. (45) Date of Patent: Jan. 31, 2012

(54) IMAGE PROCESSING APPARATUS, IMAGE FORMING APPARATUS, IMAGE PROCESSING SYSTEM, COMPUTER PROGRAM AND RECORDING MEDIUM

(75) Inventors: Haruo Yamamoto, Osaka (JP); Makoto Ohtsu, Yamatokoriyama (JP); Masakazu Ohira, Nara (JP); Hitoshi Hirohata, Hashimoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 1169 days.

(21) Appl. No.: 11/898,988

(22) Filed: Sep. 18, 2007

(65) Prior Publication Data

US 2008/0260260 A1    Oct. 23, 2008

(30) Foreign Application Priority Data

Sep. 19, 2006 (JP) .................................. 2006-253091
Jun. 6, 2007 (JP) .................................. 2007-150811
Sep. 5, 2007 (JP) .................................. 2007-230558

(51) Int. Cl.
*G06K 9/00* (2006.01)
(52) U.S. Cl. ........................................................ 382/181
(58) Field of Classification Search .................. 382/118, 382/181–231, 124–127; 358/500–540
See application file for complete search history.

(56) References Cited

U.S. PATENT DOCUMENTS

| 5,282,026 | A | | 1/1994 | Nagata |
| 5,465,353 | A | | 11/1995 | Hull et al. |
| 5,867,591 | A | * | 2/1999 | Onda ........................... 382/154 |
| 2002/0005329 | A1 | | 1/2002 | Sugata et al. |
| 2002/0131080 | A1 | | 9/2002 | Enomoto |
| 2003/0091218 | A1 | * | 5/2003 | Hamid ........................... 382/124 |
| 2003/0202696 | A1 | * | 10/2003 | Simard ........................... 382/195 |
| 2004/0057627 | A1 | | 3/2004 | Abe et al. |
| 2004/0101199 | A1 | * | 5/2004 | Lee et al. ....................... 382/209 |
| 2004/0108183 | A1 | | 6/2004 | Sugata et al. |
| 2005/0041863 | A1 | * | 2/2005 | Ray et al. ....................... 382/181 |
| 2005/0089212 | A1 | * | 4/2005 | Mashitani et al. ............. 382/154 |

FOREIGN PATENT DOCUMENTS

| JP | 4-282968 | A | 10/1992 |
| JP | 7-74945 | A | 3/1995 |
| JP | 11-46299 | A | 2/1999 |
| JP | 11-308444 | A | 11/1999 |
| JP | 2001-5831 | A | 1/2001 |
| JP | 2001-331836 | A | 11/2001 |
| JP | 2002-277984 | A | 9/2002 |
| JP | 2003-132354 | A | 5/2003 |
| JP | 2003-187215 | A | 7/2003 |
| JP | 2003-233279 | A | 8/2003 |
| JP | 2004-54751 | A | 2/2004 |
| JP | 2004-118296 | A | 4/2004 |

(Continued)

*Primary Examiner* — Alex Liew
(74) *Attorney, Agent, or Firm* — Birch, Stewart, Kolasch & Birch, LLP

(57) ABSTRACT

An image processing apparatus includes a feature point calculating section for extracting two or more connected components from a document image of interest and calculating the feature point from the centroid defined in each of the connected components, a features calculating section for calculating the features of the document image from the distance between the feature points, a voting processing section for voting one of the registered images which is similar to the document image as reviewing the features, and a similarity judging process section for judging the similarity from the result of the voting, wherein the description of the processing to be executed for the output is determined from the result of the similarity judgment.

14 Claims, 43 Drawing Sheets

FOREIGN PATENT DOCUMENTS

| | | |
|---|---|---|
| JP | 2004-350212 A | 12/2004 |
| JP | 2006-174183 A | 6/2006 |
| JP | 2006-211399 A | 8/2006 |
| JP | 2006-323580 A | 11/2006 |
| WO | WO-2006/092957 A1 | 9/2006 |

\* cited by examiner

FIG.2

| INDEX OF DOCUMENT | DESCRIPTION OF PROCESS |
|---|---|
| ID1 | MONOCHROME COPY |
| ID3 | PRINTING IN TWO COLORS |
| ID4 | FACSIMILE TRANSMISSION |
| ID5 | FILING |
| ID7 | DUPLEX COPY |
| ID9 | TWO IN ONE |
| ID11 | COPY AND STAPLING |
| ID15 | COPY AND FACSIMILE TRANSMISSION |
| ⋮ | ⋮ |

FIG.3

| INDEX OF DOCUMENT | DESCRIPTION OF PROCESS ||||
|---|---|---|---|---|
| | OPERATION | COLOR | IMAGE QUALITY | FINISHER |
| ID1 | COPY | TWO COLORS | AUTO | NONE |
| ID2 | FACSIMILE | MONOCHROME | HIGH QUALITY | - |
| ID3 | FILING | COLOR | 200DPI/HIGH QUALITY | - |
| ID4 | COPY | COLOR | HIGH QUALITY | STAPLING |
| ID5 | COPY | MONOCHROME | AUTO | DUPLEX COPY |
| ID6 | E-MAIL | MONOCHROME | AUTO | - |

FIG.5

| -3 | -3 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |

FEATURE POINT (CENTROID)

FEATURE POINT A (CENTROID A)

FEATURE POINT B (CENTROID B)

FIG.12A

| HASH VALUE | INDEX OF DOCUMENT |
|---|---|
| H1 | ID1 |
| H2 | ID1 |
| H3 | ID1, ID2 |
| H4 | ID1 |
| H5 | ID1 |
| H6 | ID1, ID2 |
| ... | ... |

FIG.12B

| HASH VALUE | INDEX OF DOCUMENT |
|---|---|
| H1 | ID1, ID1 |
| H2 | ID1 |
| H3 | ID1, ID2 |
| H4 | ID1 |
| H6 | ID1, ID2 |
| ... | ... |

FIG. 15

| INDEX OF DOCUMENT | DESCRIPTION OF PROCESS | DESTINATION |
|---|---|---|
| ID1 | MONOCHROME COPY | |
| ID3 | PRINTING IN TWO COLORS | |
| ID4 | FACSIMILE TRANSMISSION | 123 - 456 - 7890 |
| ID5 | FILING | FOLDER A |
| ID7 | DUPLEX COPY | |
| ID9 | TWO IN ONE | |
| ID11 | COPY AND STAPLING | |
| ID15 | COPY AND FACSIMILE TRANSMISSION | |
| ⋮ | ⋮ | |

FIG. 16

| INDEX OF DOCUMENT | DESCRIPTION OF PROCESS ||||| DESTINATION |
|---|---|---|---|---|---|
| | OPERATION | COLOR | IMAGE QUALITY | FINISHER | |
| ID1 | COPY | TWO COLORS | AUTO | NONE | |
| ID2 | FACSIMILE | MONOCHROME | HIGH QUALITY | - | 123-456-7890 |
| ID3 | FILING | COLOR | 200DPI/HIGH QUALITY | - | FOLDER A |
| ID4 | COPY | COLOR | HIGH QUALITY | STAPLING | |
| ID5 | COPY | MONOCHROME | AUTO | DUPLEX COPY | |
| ID6 | E-MAIL | MONOCHROME | AUTO | - | |

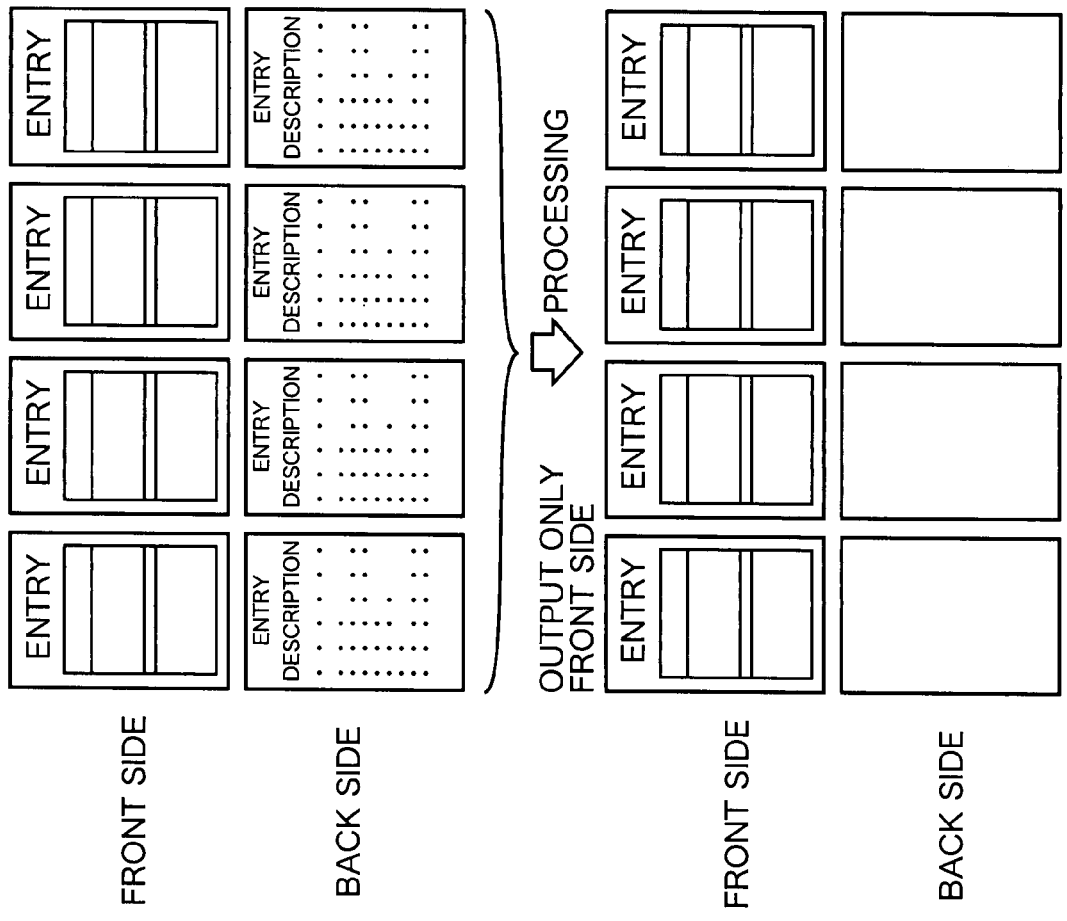
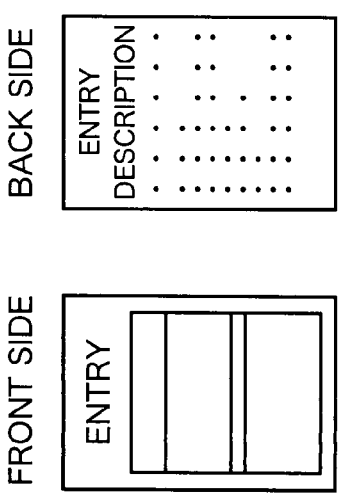
FIG. 18A
FIG. 18B

FIG. 21

| | RESOLUTION | TONE | GAMMA |
|---|---|---|---|
| MINISTRY OF FINANCE MINISTRY OF PUBLIC MANAGEMENT | 300DPI OR HIGHER | 256 LEVELS OR HIGHER FOR EACH R, G, B | $\gamma=1.0$ |
| MINISTRY OF HEALTH, LABOR AND WELFARE | 300DPI OR HIGHER | 256 LEVELS OR HIGHER FOR EACH R, G, B | $\gamma=1.0$ |
| MINISTRY OF ECONOMY, TRADE AND INDUSTRY | 150DPI OR HIGHER | COLOR/GRAY SCALE | — |
| | 200DPI OR HIGHER | BINARY | — |

USUAL MODE electronic-DOCUMENT MODE

FIG.35

| | COLOR PRINTING | PRINTING IN TWO COLORS | FILING | e-MAIL TRANSMISSION | FACSIMILE TRANSMISSION | DUPLEX COPY | N-UP PRINTING | STAPLING |
|---|---|---|---|---|---|---|---|---|
| MFP 1 | ○ | ○ | ○ | ○ | ○ | ○ | ○ | ○ |
| MFP 2 | ○ | × | ○ | ○ | ○ | ○ | ○ | × |
| MFP 3 | × | × | × | ○ | ○ | ○ | ○ | × |
| ... | ... | ... | ... | ... | ... | ... | ... | ... |

○ : OPERABLE
× : NOT OPERABLE

IMAGE PROCESSING APPARATUS, IMAGE FORMING APPARATUS, IMAGE PROCESSING SYSTEM, COMPUTER PROGRAM AND RECORDING MEDIUM

CROSS-REFERENCE TO RELATED APPLICATIONS

This Nonprovisional application claims priority under 35 U.S.C.§119(a) on Patent Application No. 2006-253091, No. 2007-150811 and No. 2007-230558 filed in Japan on Sep. 19, 2006, Jun. 6, 2007 and Sep. 5, 2007 respectively, the entire contents of which are hereby incorporated by reference.

BACKGROUND

1. Technical Field

The present invention relates to an image processing apparatus, an image forming apparatus, and an image processing system, which are capable of determining a description of an output processing correspondingly to a document image to be read out, a computer program and a recording medium.

2. Description of the Related Art

An image processing method has been proposed for reading a document image with a scanner and comparing the image with image data registered in advance in order to judge similarity, such as a matching method for collating keywords extracted from the image by an OCR, or a method for specifying the image to be processed of a document note including lines and examining a feature of the lines (See, for example, Japanese Unexamined Patent Publication No. 2004-118296).

More particularly, while electronic texts of different forms which are different in the form or the data format have been converted into files of the data forms and stored in a document management server, the data of an image produced by a reader is subjected to character recognition process for conversion to a text data and then is examined whether or not its text data matches one of the stored electronic text files. When it is judged that the matched text file exists, the matched text file stored in the document management server is printed out to have a copy of the read image data with no deterioration and at high quality.

However, when a document of a certain format is almost always output in the same pattern, the setting of output conditions may be troublesome to be carried out at each printing processing. Also, when the setting of output conditions is found improper, it has to be repeated once again.

Moreover, in a case where the selection between color printing and monochromatic printing is automatically executed, its actual processing with the existing automatic color selection (ACS) technique employed in an image processing apparatus disclosed in Japanese Unexamined Patent Publication No. 4-282968 may permit simply the production of color prints from a color document and monochromatic prints from a black-and-white document respectively. Even if one document of interest to be copied is a color image, it may preferably be printed in a monochromatic form. The above prior art however fails to respond to the selection between color printing and monochromatic printing.

SUMMARY

The present invention has been developed in view of the foregoing aspects and its object is to provide an image processing apparatus, an image forming apparatus, an image processing system, a computer program and a recording medium which are characterized by, when it is judged that a document image of interest is similar to a specified image, reading a data of the output processing stored in relation with the specified image and carrying out the output processing in response to the readout data, whereby the setting for output processing conditions by a user can be eliminated and its failure will be avoided.

An image processing apparatus according to the present invention includes: an output processing section for executing an output process based on an image data obtained by reading a document image; a storage section in which the description of the output process to be executed by the output processing section is stored in relation with a stored image; a determining section for determining whether or not the document image is similar to the stored image based on the obtained image data; a reading section for reading out the description of the output process stored in relation with the stored image from said storage section when determining that the image is similar to the stored image; and a controller for controlling the output process to be executed by said output processing section in accordance with the read out description of the output process.

The image processing apparatus according to the present invention may be modified to further include: a receiving section for receiving a modification of the description to be executed; and an updating section for storing the history of the modification of the description and, in response to the history, updating the description of the process to be stored in said storage section.

The image processing apparatus according to the present invention may be modified in which the description of the process includes a process of inhibiting the output of the image related to the obtained image dada or replacing the image related to the obtained image data with another image before outputting the image.

The image processing apparatus according to the present invention may be modified in which the controller is further capable of selecting, based on the mode of the output process, between the process of inhibiting the output of the image related to the obtained image data and the process of replacing the image related to the obtained image data with another image before outputting the image.

The image processing apparatus according to the present invention may be modified in which the description of the process includes at least one of process of modifying the resolution of the image related to the obtained image data, adjusting the gamma characteristic of the image related to the obtained image data, converting the color signal related to the obtained image data into an achromatic signal, and reproducing the half tone related to the obtained image data.

The image processing apparatus according to the present invention may be modified in which the controller is further capable of performing operations of displaying the description of the process and the image processed according to said description and requesting a user to confirm the description; and when the user rejects the description, modifying at least an item of said description rejected by the user before repeating said processing.

The image processing apparatus according to the present invention may be modified in which the description of the process further includes at least one of process of assigning the image related to the obtained image data with an electronic signature, assigning the image related to the obtained image data with a time stamp, encrypting the image related to obtained image data, and assigning the image related to the obtained image data with a result of character recognition on said image data.

The image processing apparatus according to the present invention may be modified to further include: a features storage section for storing features of stored images; a features calculating section for calculating features of the document image based on the obtained image data; and a comparator section for comparing between the calculated features and the features of the stored images, wherein said determining section determines whether or not the document image is similar to the stored image base on the comparison by the comparator section.

The image processing apparatus according to the present invention may be modified to further include: a region extracting section for extracting a plurality of regions composed of identical factors from said document image; and a centroid calculating section for calculating the centroid in each of the extracted regions, wherein the features of the document image is calculated based on the centroid.

The image processing apparatus according to the present invention may be modified in which the features are represented by an invariant parameter which remains unchanged regardless of a geometrical change of said document image such as rotation, parallel movement, or scaling.

The image processing apparatus according to the present invention may be modified in which the features are represented by an invariant parameter which remains unchanged regardless of a geometrical change of said document image such as rotation, parallel movement, or enlargement/reduction, and said determining section votes the stored image of which the features are equal to the calculated features and compare the result of the voting with a predetermined threshold value to judge whether or not the document image is similar to the stored image.

An image forming apparatus according to the present invention includes: the above-described image processing apparatus; and an image forming section for forming on a sheet an image processed by the image processing apparatus.

The image forming apparatus according to the present invention may be modified in which, in order to convert the document image to an electronic data of a predetermined format which is then stored, a mode of the processing is provided for reading the document image as conforming to the format.

An image processing system according to the present invention includes: an image processing apparatus; and a server connected for communication with the image processing apparatus, wherein said image processing apparatus and the server comprise in a distributed manner: a storage section in which the description of the output process used for subjecting the image data produced by reading the document image to an output process is stored in relation with a stored image; a determining section for determining from said image data whether or not said document image is similar to the stored image; a reading section for, when the determining section determines that the document image is similar to the stored image, reading from said storage section the description of the process stored in relation with said stored image; and a control section for controlling the output process in accordance with the read out description of the process.

A computer program according to the present invention, characterized by causing a computer to execute: a procedure for storing the description of the output process used for subjecting the image data obtained by reading the document image to an output process in relation with a stored image; a procedure for determining whether or not the document image is similar to the stored image based on the obtained image data; a procedure for reading the description of the processing stored in relation with the stored image from the storage section, when it is determined that the document image is similar to the stored image; and a procedure for controlling the output process according to the read out description.

A recording medium according to the present invention stores thereon a computer program executable to perform the steps of: storing the description of the output process used for subjecting the image data obtained by reading the document image to an output processing in relation with a specified image; determining whether or not said document image is similar to the stored image based on the obtained image data; when it is determined that the document image is similar to the stored image, reading the description of the processing stored in relation with the stored image from the storage section; and controlling the output process according to the read out description.

According to the present invention, when it is judged that a document image of interest is similar to a specified image, the description of the processing stored in advance in relation with the specified image is read out and used for controlling the output processing. This allows the setting of output processing conditions to be eliminated while any fault setting by the user can be avoided. Also, while the conventional automatic color selection system enables simply the selection of output of a monochromatic print, the present invention allows the processing of producing a monochromatic print from a color document to be selectively carried out as is disabled by the conventional system.

The present invention is applicable to not only a document image read with a scanner but only any other image of an electronic data format produced by filling a particular format with required items on a personal computer employing the application software or an electronic data shifted from a document image read with a scanner to a file format such as the JPEG format. For example, since the electronic data is processed with two or more software, its image produced through interpreting the PDL (page description language) with a RIP (raster image processor) may be examined for the similarity to a registered image by a multi function printer (MFP) or a server.

When the electronic data is of an image format encoded by, for example, JPEG or GIF technology in the MFP or the server, it can first be decoded and then subjected to a processing of converting, for example, from a YCC signal to an RGB signal before being examined whether or not it is similar to the registered image.

When the electronic data is of a PDF format, the present invention may be applied to its image data, when it has been decoded to an RGB form after stored in the form of an encoded image format produced by JPEG technology.

According to the present invention, when the description of the processing is updated, its updating history is recorded, stored, and used for updating the description in the future. This allows the actual usage by the user to be clarified, thus easing the task for setting the output processing conditions.

The present invention allows the output of a desired image to be inhibited from distribution, hence restricting the processing of copying unwanted pages. Also, as the image to be released is replaced by a corresponding image, its blank may be printed out and the output or transmission of any unwanted data will be avoided.

According to the present invention, any document to be controlled by an applicable e-document standard can be transferred to a receiver only after its has been subjected to a relevant processing permitted by the receiver.

According to the present invention, even if the processing is improper, its setting may easily be modified before it being subjected to the processing for storage.

According to the present invention, a document image of interest is compared in the features with the specified image to examine whether or not the two images are similar to each other. This allows the similarity between the two images to be judged at higher speed and accuracy through the arithmetic operation of a hardware.

According to the present invention, two or more regions of identical factors to be extracted from a document image, the centroid in each of the regions is calculated, and the features of the document image are determined from the location of the centroid. This allows the features of each image of interest to be extracted with much ease, thus performing the similarity judgment at higher speed and accuracy.

According to the present invention, even when a document of interest to be scanned is placed upside down, it can be subjected to the collating processing without error.

According to the present invention, the features are expressed by an unchanged parameter which remains unchanged regardless of rotation, parallel movement, or size enlargement/reduction of a document image while the processing of voting the registered image which is matched in the features is carried out. This permits the collating processing to be executed at higher accuracy regardless of noises or extra writings.

The present invention is applicable to a printer and a digital multi function printer.

According to the present invention, the document to be controlled by any applicable e-document standard can be read through over-scanning technique, whereby its reading conditions will need to be preset by no user.

According to the present invention, an image reading apparatus can be provided where the document to be controlled by any applicable e-document standard can be submitted to a receiver after subjected to a proper processing pertinent to the receiver.

The above and further objects and features of the invention will more fully be apparent from the following detailed description with the accompanying drawings.

BRIEF DESCRIPTION OF THE SEVERAL VIEWS OF THE DRAWINGS

FIG. 2 is a schematic diagram showing an example of the processing description decision table;

FIG. 3 is a schematic diagram showing another example of the processing description decision table;

FIG. 5 is a schematic diagram showing a composite filter used in the filtering processor;

FIGS. 12A and 12B are schematic diagrams showing an arrangement of the hash table;

FIG. 15 is a schematic diagram showing an arrangement of the processing description decision table registered with destinations;

FIG. 16 is a schematic diagram showing another arrangement of the processing description decision table registered with destinations;

FIGS. 18A and 18B are explanatory views showing a document note which carries the description on the back side and a processing of the note;

FIG. 21 is a schematic diagram showing a guide line for the e-document standard;

FIG. 35 is a schematic diagram showing the function list table;

DETAILED DESCRIPTION

Figure 1:
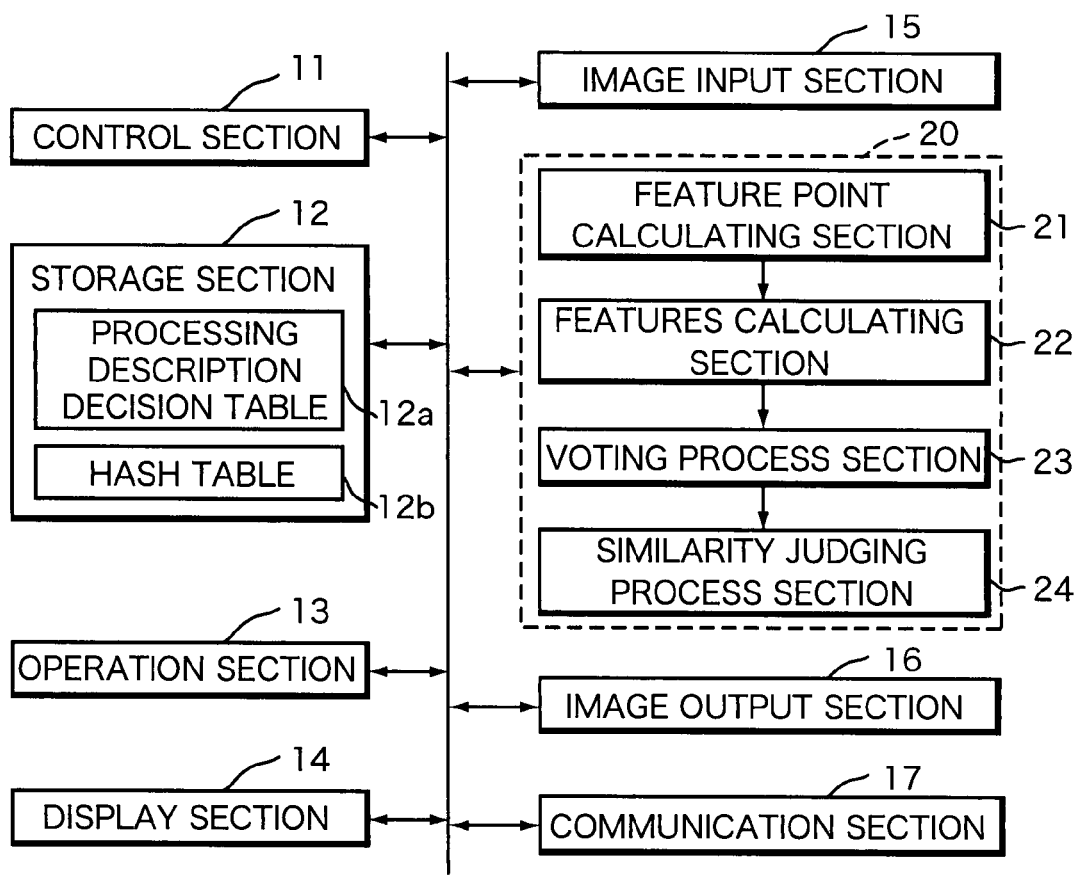
FIG. 1 is a block diagram of the internal arrangement of an image processing apparatus showing one embodiment of the present invention.

Several embodiments of the present invention will be described in more detail referring to the drawings.

Embodiment 1

FIG. 1 is a block diagram of the internal arrangement of an image processing apparatus according to the present invention. The image processing apparatus of this embodiment includes a control section 11, a storage section 12, an operation section 13, a display section 14, an image input section 15, an image output section 16, a communication section 17, and a document matching process section 20.

The control section 11 includes a CPU, a ROM, and a RAM. The control section 11 is provided for controlling the processing of each hardware through operating the control programs stored in the ROM, whereby the image processing apparatus of this embodiment can be functioned as a system.

The storage section 12 is a nonvolatile memory means such as a memory or an HDD, in which a portion of its storage region is used for a processing description decision table 12a and a hash table 12b. The processing description decision table 12a is provided for specifying the description of the processing to be executed as an output processing when a document image is received and found similar to one of the images (referred to as registered images hereinafter) which have been registered and stored in advance in the device (namely, the storage 12). The hash table 12b is provided for specifying the relationship between the features in the document image and the index indicating a document type.

FIG. 2 is a schematic diagram showing one example of the processing description decision table 12a. The processing description decision table 12a indicates the relationship between the index of the document and the description of the processing. The index of the document is an identifier for identifying the registered image. When the document image is judged by a similarity judging process section 24, described later, that it is similar to one of the registered images, the index assigned to the registered image is selected. In the processing description decision table 12a, each index represents the description of the processing and its selection determines the processing. For example, when the index of "ID1" is selected, the processing involves printing in two colors. Similarly, the other indexes to be selected represent facsimile transmission, filing, duplex copying, two-in-one editing (two separated images), copying and stapling, copying and facsimile transmission, and so on.

The description of the processing described above exhibits a default processing, and may be modified depending on the requirements in use.

FIG. 3 is a schematic diagram of another example of the processing description decision table 12a. The processing description decision table 12a shown in FIG. 3 is provided for specifying the relationship between the index indicating a document and steps of the processing. The description of the processing may be modified using the operation section 13. For example, when a demand for modifying the processing is received from the operation section 13, the default processings are displayed for each mode to allow the user to selectively determine a desired procedure of the processing.

The operation section 13 is an interface for receiving commands from the user, which includes an array of switches and buttons. The display section 14 is an interface for displaying a variety of visual information to be notified by the user, which includes a liquid crystal display or the like.

The image input section 15 is a means for optically reading a document image, which includes a light source for illuminating a document to be read and an image sensor such as CCD (charge coupled device). In the image input section 15, the reflection of light from the document placed at the readout location is focused on the image sensor which in turn produces and release an analog electric signal in RGB colors (R: red, G: green, and B: blue) of the image.

Although the image processing apparatus of this embodiment permits the image input section 15 to operate for reading the a document image and producing from the image data to be released, it may provide another image data which has been stored in the storage section 12 and selectively picked up by the communication section 17 before released. The image data is then subjected to a processing of examining the similarity with the registered image and, when its similarity is accepted, subjected to the description of the processing specified by the processing description decision table 12a.

The image output section 16 is a means for producing an image from the image data on a sheet of paper, OHP film, or other medium. The image output section 16 includes, for the purpose, a charging device for charging a photo-sensitive drum to a desired potential, a laser writing device for emitting a beam of laser in response to the image data received from the outside thus to develop a static latent image on the photo-sensitive drum, a developer device for apply toner onto the static latent image developed on the photo-sensitive drum for visualization, and a transfer device for transferring the toner image from the photo-sensitive drum onto a sheet of paper (which all are not shown), whereby each image of interest is printed down by the electronic photographic technique. The electronic photographic technique using a laser writing device for printing the image may be replaced by any other applicable description such as ink-jet printing, thermal transfer printing, or sublimation printing.

The communication section 17 is equipped with an interface for connecting with communication networks including a facsimile network, a local area network, and the Internet in order to transmit and receive facsimile messages, various data, and programs.

The document matching process section 20 includes a feature point calculating section 21 for extracting the connected components from characters and rules in the document image thus to calculate and release the centroid in each connected component as the feature point, a features calculating section 22 for determining from the feature point the features (hash value) which remain unchanged during the geometric variation including rotation, parallel movement, and enlargement/reduction of the image, a voting processing section 23 for voting one of the documents registered in the hash table 12b through the features calculated from the image, and a similarity judging process section 24 for determining the similarity from the voting result and judging whether or not the document image is similar to the registered image.

The judgment made by the similarity judging process section 24 is transferred to the control section 11. Upon receiving the judgment that the document image is similar to the registered image, the control section 11 reads the description of the processing assigned to the registered image from the processing description decision table 12a and executes the processing according to the description. On the other hand, when receiving a judgment that the document image is not similar to the registered image, the control section 11 executes the processing according to the requirements determined by the operation section 13.

Although the judgment is made in this embodiment to select the description of the processing from the processing description decision table 12a when the document image is similar to the registered image, the user may finally decide whether the description of the processing is actually carried out or not. For example, the document is examined for the similarity during the pre-scanning processing and its assigned processing is displayed on the display section 14 for asking the user whether the description of the processing displayed is carried out or not. When receiving the permission of starting the description of the processing from the user via the operation section 13, the control section 11 proceeds the description of the processing. If the description of the processing which is displayed is not permitted by the user operating the operation section 13, the control section 11 proceeds the output processing without setting of the description of the processing.

When the description of the processing is not accepted, the selection of another description may be executed. Simultaneously, the processing description decision table 12a may also be modified depending on the result of learning the previous modification of the processing. The method of learning involves counting the number of selections of one description of the processing throughout a length of time and selectively employing the description of the processing at the most of the frequency.

Figure 4:
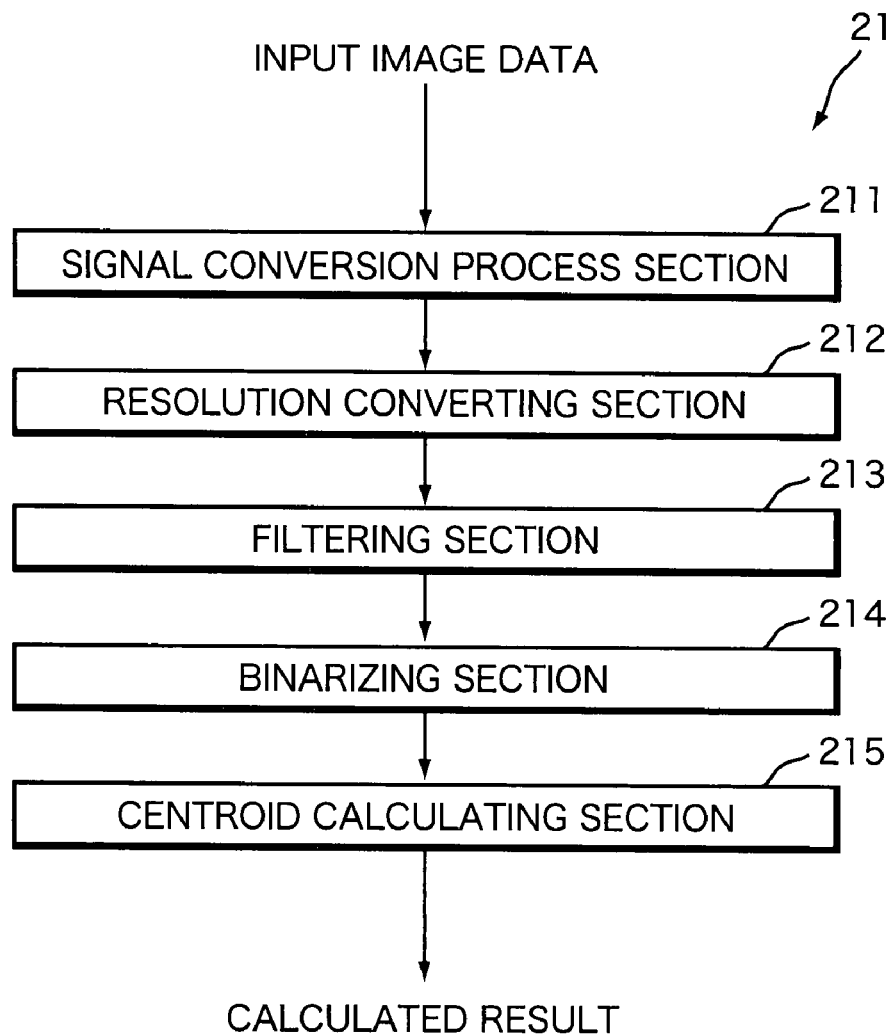
FIG. 4 is a block diagram showing an arrangement of the feature point calculating section.

The processing of the document matching process section 20 will be described in more detail. FIG. 4 is a block diagram showing an arrangement of the feature point calculating section 21. The feature point calculating section 21 includes a signal conversion process section 211, a resolution converting section 212, a filtering section 213, a binarizing section 214, and a centroid calculating section 215.

The signal conversion section 211 is provided for, when the image data is of a color image, subjecting the data to an achromatic processing for converting into a lightness signal or a luminance signal. For example, the luminance signal may be produced from $$Yj = 0.30Rj + 0.59Gj + 0.11Bj.$$

Where Yj is the luminance of each pixel and Rj, Gj, and Bj are color components. Alternatively, the RGB signal may be converted into an L*a*b* signal of CIE1976 format (CIE: Commission International de l'Eclairage, L*: lightness, a*, b*: chromacity).

The resolution converting section 212 is provided for, when the image data is optically modified in the magnification by the image input section 15, repeating the processing of modification in the magnification until the resolution reaches a desired rate. The resolution converting section 212 can also shift the resolution from its rate at a document image size in the image input section 15 to a lower rate. For example, the image is declined from 600 dpi (dot per inch) of its original resolution to 300 dpi.

The filtering section 213 is provided for eliminating a difference in the spatial frequency characteristic between the types of the image input apparatus. In general, the image signal produced by a CCD may contain errors such as burrs derived from variations on the aperture in the photo-sensitive side, the transfer efficiency, and the after image of the CCD and physical error or integral effect of the scanning processing. The favorable filtering processing (emphasizing) of the filtering section 213 corrects burrs caused by MTF deterioration. Also, unwanted high-frequency components in the image signal which may interrupt the feature point extracting processing at the succeeding step can be suppressed. In brief, the processing of emphasizing and smoothing can be carried out using the effect of a composite filter.

FIG. 5 is a schematic diagram of an arrangement of the composite filter used in the filtering section 213. The composite filter may have a size of 7×7. The filtering processing of the composite filter is executed throughout the pixels of the image signal through scanning the image of interest. The composite filter is not limited to the size of 7×7 but may be used of 3×3 or 5×5. The filter coefficient to be employed is illustrative but not of limitation and can arbitrarily be determined depending on the property of the image input section 15.

The binarizing section 214 is provided for producing from the achromatic image data a binary data which is suited for calculating the centroid. More particularly, the binarizing section 214 executes the binarization of the image signal using the image data (the luminance value in the luminance signal or the lightness value in the lightness signal) as a threshold value.

The centroid calculating section 215 is provided for calculating the centroid in a connected component in the binary data (expressed by "1" and "0") and releasing the same as a feature point to the features calculating section 22. The method of calculating the centroid may be selected from known applicable methods. More specifically, each pixel is labeled according to the binary data of the image signal and a connected component where the pixels with the same label are grouped is specified from which the centroid is calculated as the feature point. The feature point is then received by the features calculating section 22. The feature point may be expressed by coordinates (x, y coordinates) in the binary image.

Figure 6A:
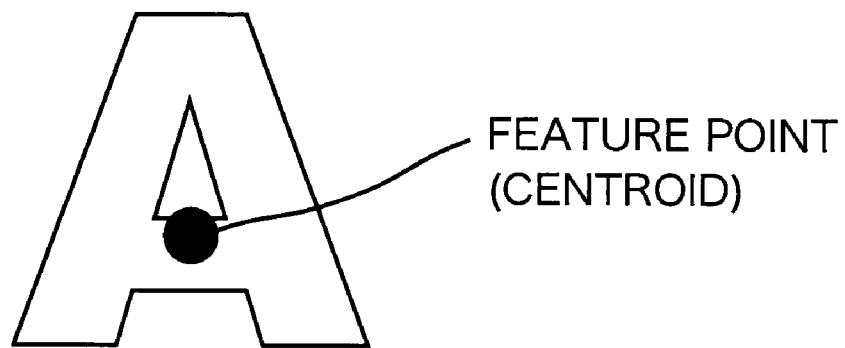
FIGS. 6A and 6B are schematic diagrams showing a processing of exacting the feature points.
Figure 6B:
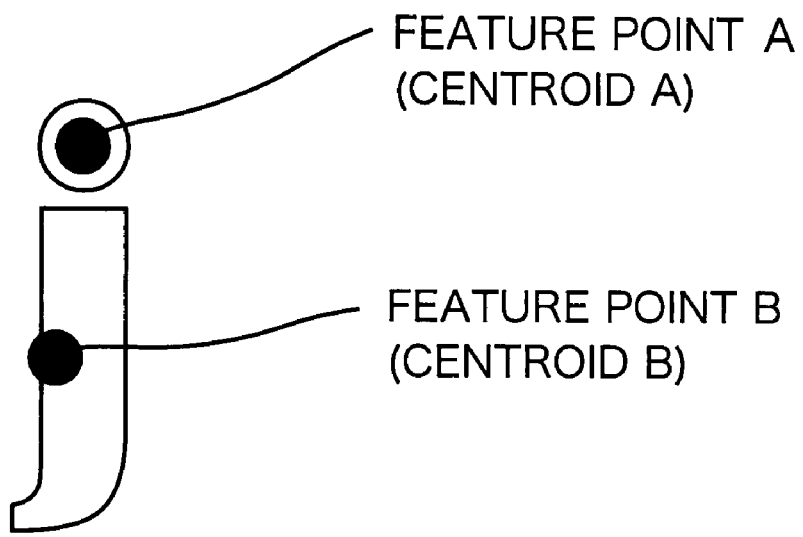

FIGS. 6A and 6B are schematic views showing examples of the feature point in the connected component. FIG. 6A illustrates a connected component in the alphabetical character "A" specified by the prescribed description, where the feature point (the centroid) is denoted by the black dot. FIG. 6B illustrates a couple of separate connected components in the alphabetical character "j" by the prescribed description. As the feature point (the centroid) is defined in each of the two separate connected components, the two feature points (A and B) are extracted from one Kanji character.

The method of calculating the features will now be described. The features calculating section 22 calculates the features from the feature points in the image determined by the feature point calculating section 21. Then, one of the feature points is selected as a current feature point and four of the feature points which are less distanced from the current feature point are defined as surrounding feature points.

Figure 7:
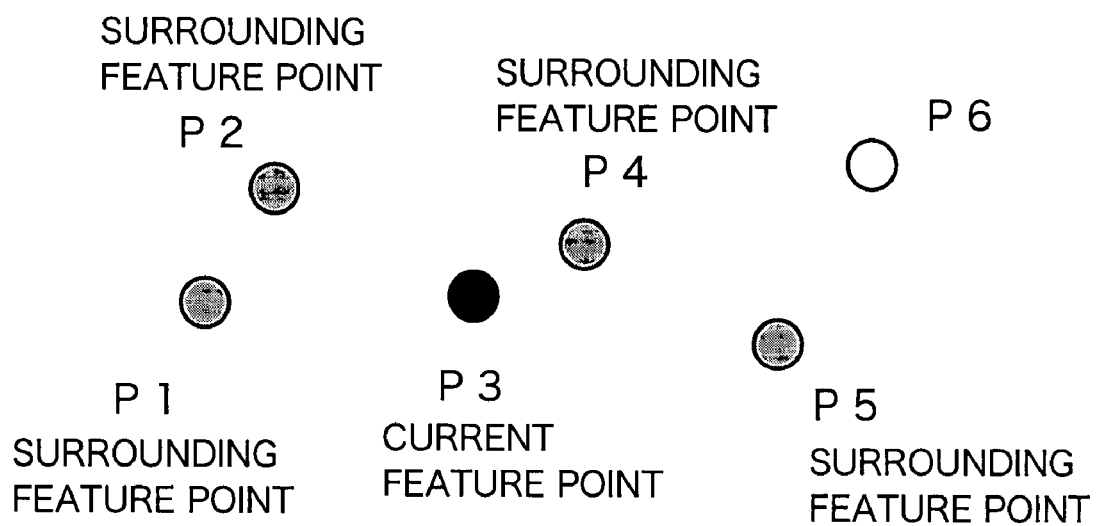
FIG. 7 is an explanatory view showing the current feature point and its surrounding feature points.

FIG. 7 is an explanatory diagram showing the current feature point and its surrounding feature points. Shown in FIG. 7 are six of the feature points P1 to P6 calculated by the feature point calculating section 21. When the feature point P3 is determined as the current feature point by the features calculating section 22, the four feature points P1, P2, P4, and P5 which are less distanced from the current feature point P3 can be selected as the surrounding feature points. The features calculating section 22 then calculates from the current feature point P3 and the surrounding points P1, P2, P4, and P5 invariants which remain unchanged during the tilting, movement, or rotation of the document image and determines the features of the document image from the invariants.

Figure 8A:
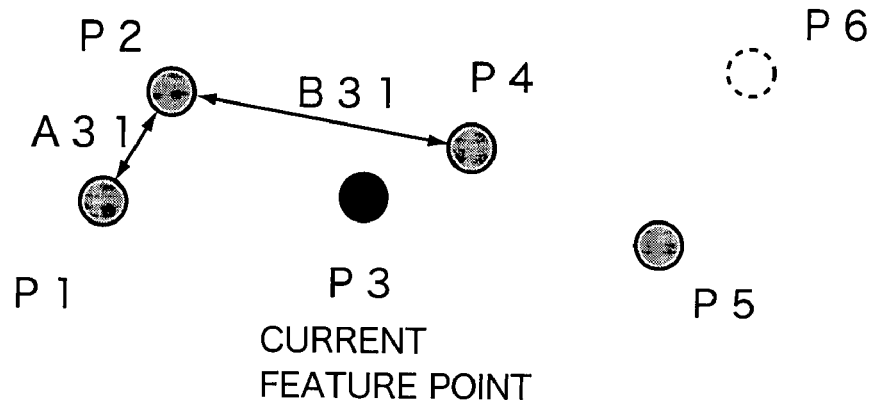
FIGS. 8A to 8C are explanatory views showing a processing of calculating the invariant based on the current feature point P3.
Figure 8B:
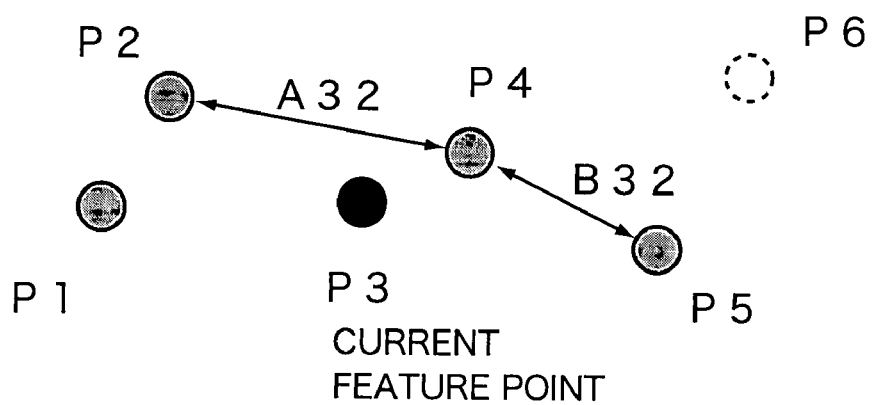
Figure 8C:
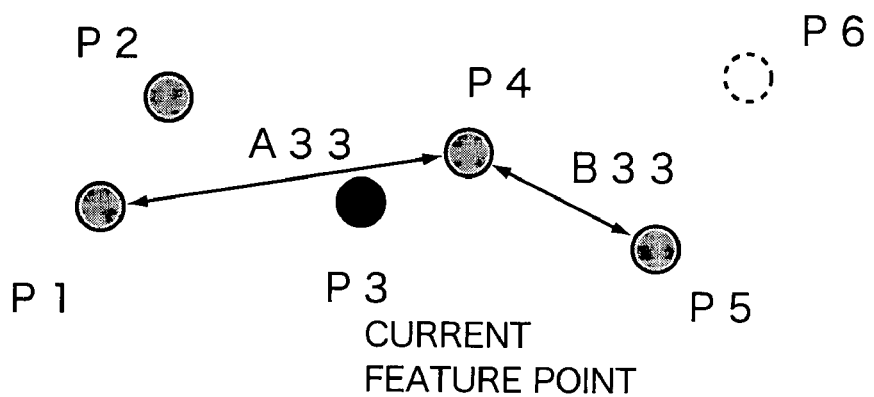

FIGS. 8A to 8C are explanatory diagrams showing the calculation of invariants based on the current feature point P3. It is now assumed that the invariant H3$j$ is dented by H3$j$=A3$j$/B3$j$ using the distances from the current feature point P3 to the surrounding feature points P1, P2, P4, and P5. When j=1, 2, and 3, A3$j$ and B3$j$ are equal to the distances between the feature points which are determines by the coordinates of the surrounding points. More specifically, three invariants are calculated, H31 from A31/B31 (See FIG. 8A), H32 from A32/B32 (See FIG. 8B), and H33 from A33/B33 (See FIG. 8C). The invariants H3$j$ remain unchanged when the document is rotated, moved, or tilted during the reading processing, hence allowing the judgment of the similarity between the images at the succeeding step to be carried out at higher accuracy.

Figure 9A:
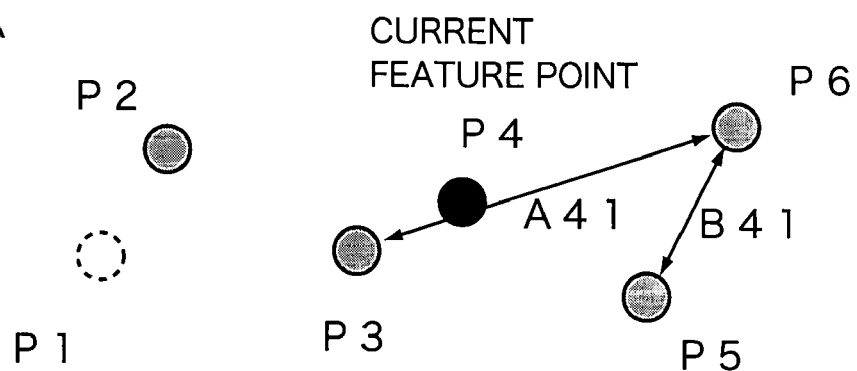
FIGS. 9A to 9C are explanatory views showing a processing of calculating the invariant based on the current feature point P4.
Figure 9B:
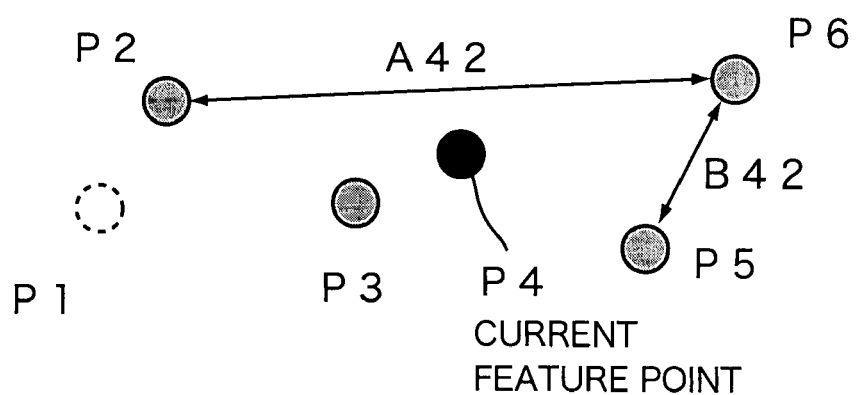
Figure 9C:
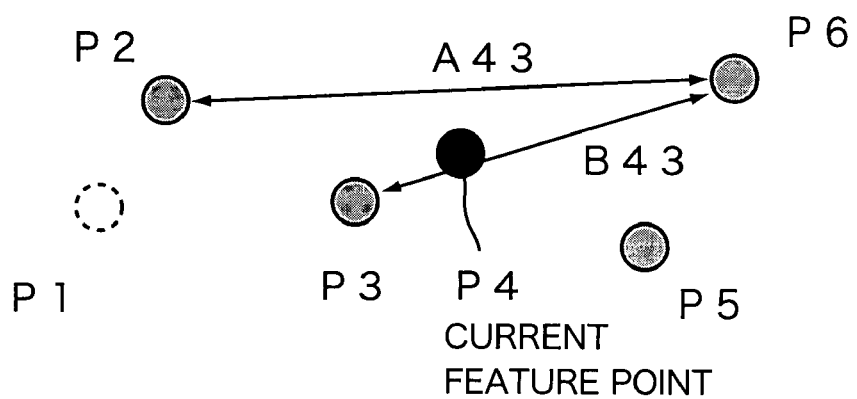
Figure 10C:
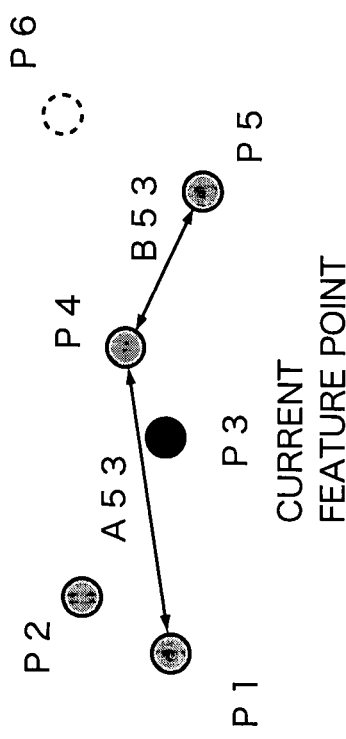
FIGS. 10A to 10D are explanatory views showing a processing of calculating the invariant based on the current feature point P3.
Figure 10D:
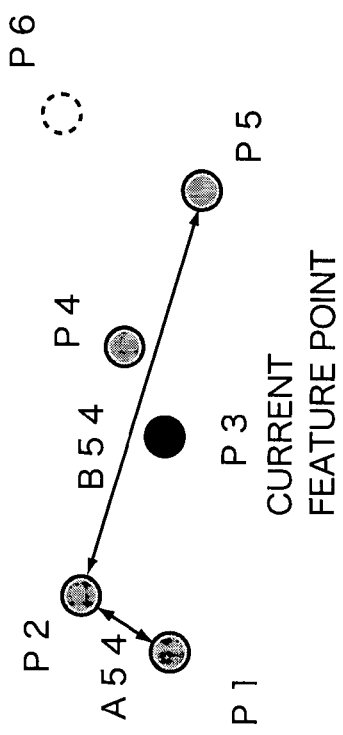
Figure 10A:
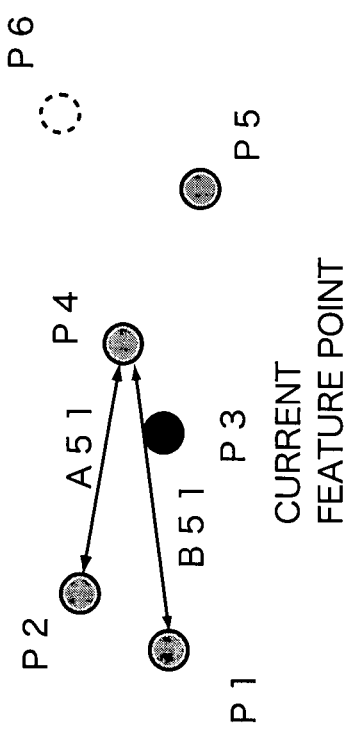
Figure 10B:
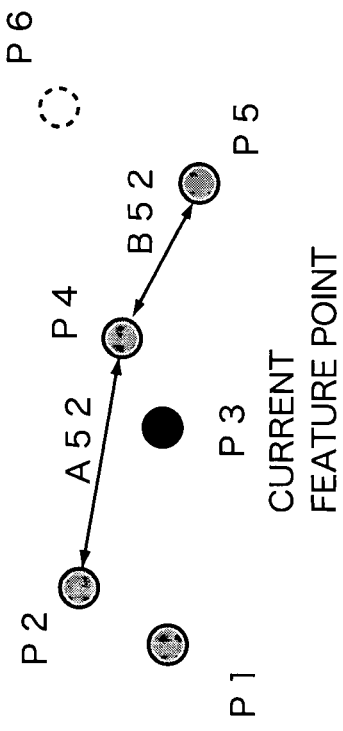
Figure 11A:
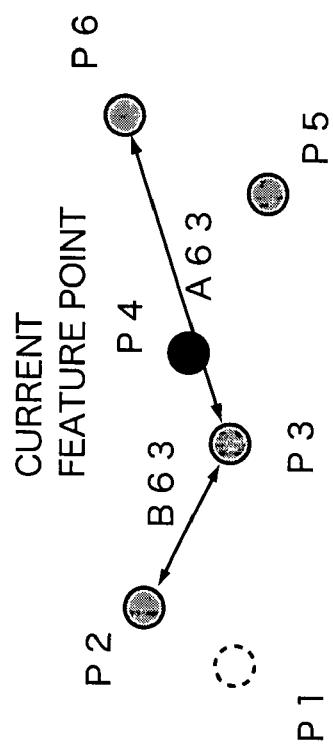
FIGS. 11A to 11D are explanatory views showing another processing of calculating the invariant about the current feature point P4.
Figure 11B:
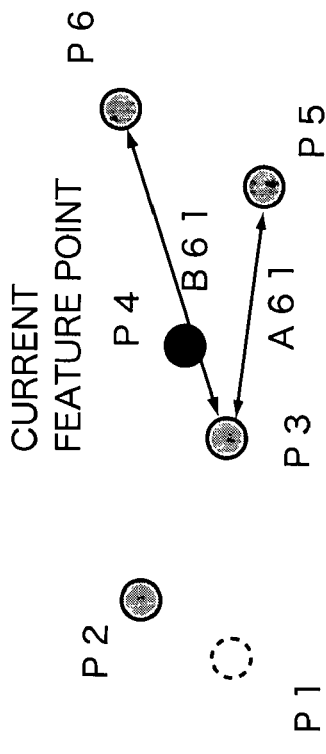
Figure 11C:
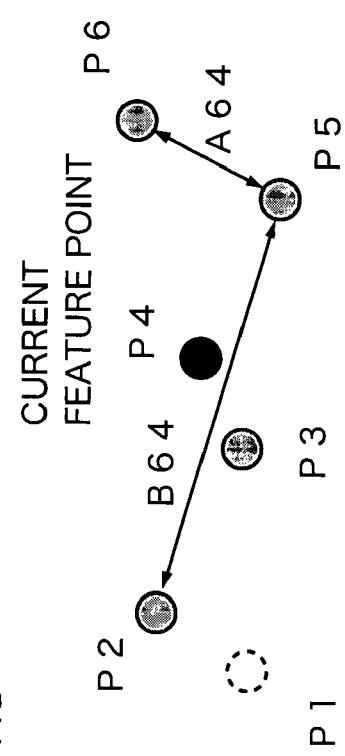
Figure 11D:
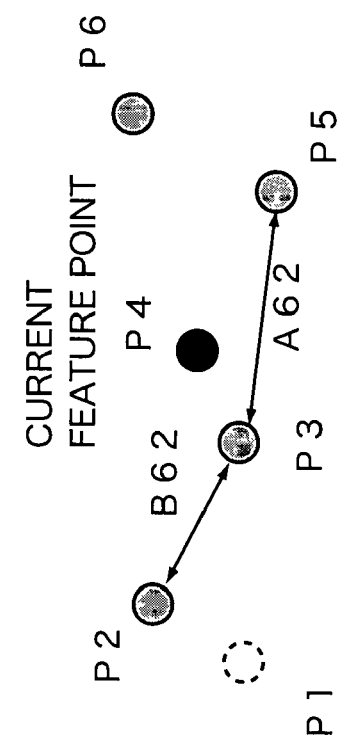

FIGS. 9A to 9C are explanatory diagrams showing the calculation of invariants based on the current feature point P4. The features calculating section 22 selects the feature points P2, P3, P5, and P6 as the surrounding feature points which are less distanced from the current feature point P4. As similar to the previous processing, three invariants 4$j$ (j=1, 2, and 3) are calculated from H4$j$=A4$j$/B4$j$, more particularly, H41 from A41/B41 (See FIG. 9A), H42 from A42/B42 (See FIG. 9B), and H43 from A43/B43 (See FIG. 9C).

When the current feature point is selected from P1, P2, P5, and P6, the same procedure is carried out by the features calculating section 22 calculating the invariants Hij (I=1, 2, ... 6; j=1, 2, 3) as shifting the current feature point from P1 to P2, P5, and P6.

Then, the features calculating section 22 calculates the features (hash value) Hi from the invariants determined with the different current feature points. When the current feature point is Pi, the hash value Hi is expressed by Hi=(Hi1×10$^2$+Hi2×10$^1$+Hi3×10$^0$)/E. In particular, i represents a natural number indicative of the number of the feature points. E is a constant for determining the remainder. For example, when E=10, the remainder ranges from 0 to 9 where the hash value falls.

The method of calculating the invariant from the current feature point may involve selecting a combination of fourth surrounding feature points P1, P2, P4, and P5 based on the current feature point P3, as shown in FIGS. 10A to 10D, and calculating the invariant H3$j$ from H3$j$=A5$j$/B5$j$ (=1, 2, 3, and 4) similar to the procedure described above. Alternatively, the invariant H4$j$ (j=1, 2, 3, and 4) may be calculated from H4$j$=A6$j$/B6$j$ from the four surrounding feature points P2, P3, P5, and P6 based on the current feature point P4, as shown in FIGS. 11A to 11D. In the latter case, the hash value Hi is determined from Hi=(Hi1×10$^3$+Hi2×10$^2$+Hi3×10$^1$+Hi4×10$^0$)/E.

The hash value as the features is simply an example but not of limitation and the features may be determined by any other hash function. Also, the surrounding feature points are, but not limited to, four as described above. For example, six of the feature points may selectively be used with equal success. In the latter case, five feature points are selected from six. The selection of five may be made in six different descriptions. Then, three may be extracted from five for calculating the invariants and determining the hash values.

FIGS. 12A and 12B are schematic diagrams showing an arrangement of the harsh table 12$b$. The hash table 12$b$ exhibits the relationship between the hash value and the index indicative of a document. More specifically, the index indicative of the document is registered as related with a point index representing the location in the document and the invariant, as shown in FIG. 12A. A set of images and texts to be collated with the image of interest are registered in the hash table 12$b$ for examining the similarity of the image. When two or more entries of the hash value are equal (H1=H5), they may be grouped to one in the hash table 12$b$ as shown in FIG. 12B.

Figure 13:
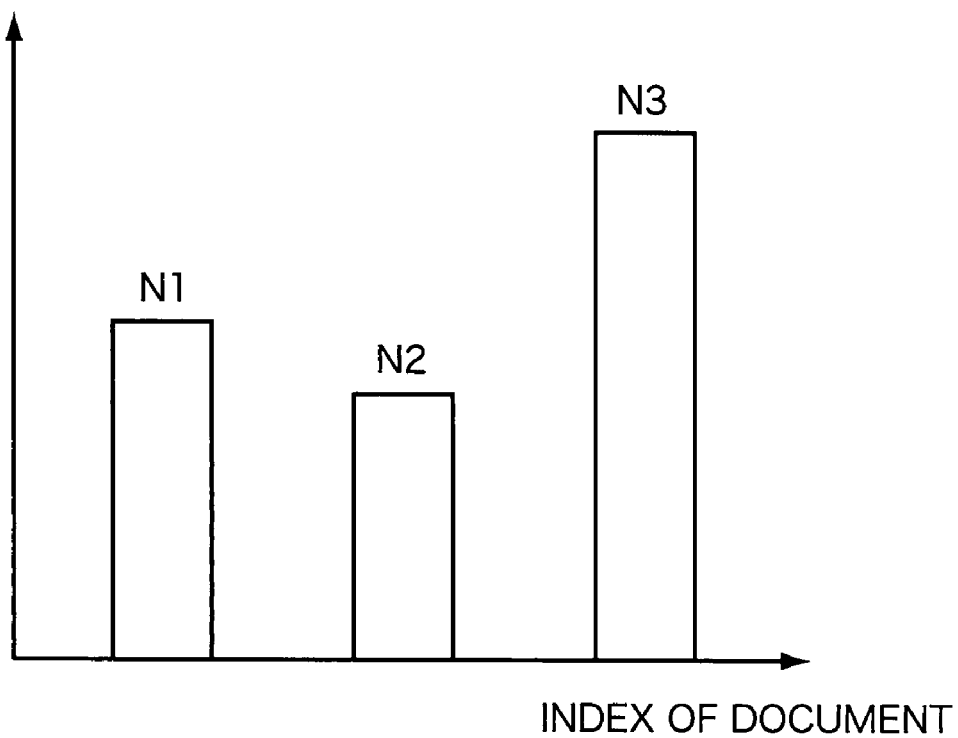
FIG. 13 is a graphic diagram showing a result of the voting processing.

The voting processing section 23 is provided for reviewing the hash table 12$b$ in response to the hash values (the features) determined by the features calculating section 22 and voting the index of a document registered. FIG. 13 is a graphic diagram showing a result of the voting. The horizontal axis represents the types of documents and the vertical axis represents the number of votes. FIG. 13 illustrates the result of voting the three different types N1 to N3 of the document. The result of the voting is transferred to the similarity judging process section 24.

The similarity judging process section 24 is provided for examining the result of the voting received from the voting processing section 23 to judge the similarity and delivering its result of the similarity judgment to the control section 11. The similarity judging process section 24 compares the number of votes (the number of approvals) received from the voting processing section 23 with the predetermined threshold value and, when the number of votes is greater than the threshold value, judges that the document image of interest is similar to the registered image. The document image of which the number of approvals is the greatest among the document images approved with the similarity judgment is then judged identical. When the number of votes received from the voting processing section 23 is smaller than the threshold value, the similarity judging process section 24 judges that the document image is similar to none of the registered images and notifies the control section 11 of the judgment of no similarity.

The method of the similarity judgment described above is an example and may be executed by, for example, dividing the number of votes by the maximum number of votes for a document (e.g., the number of the feature points) for normalization and then examining the similarity or the identity.

In response to the result of the judgment received from the similarity judging process section 24, the control section 11 reads out the description of the processing assigned to the registered image from the processing description decision table 12$a$ before performing the processing.

Figure 14:
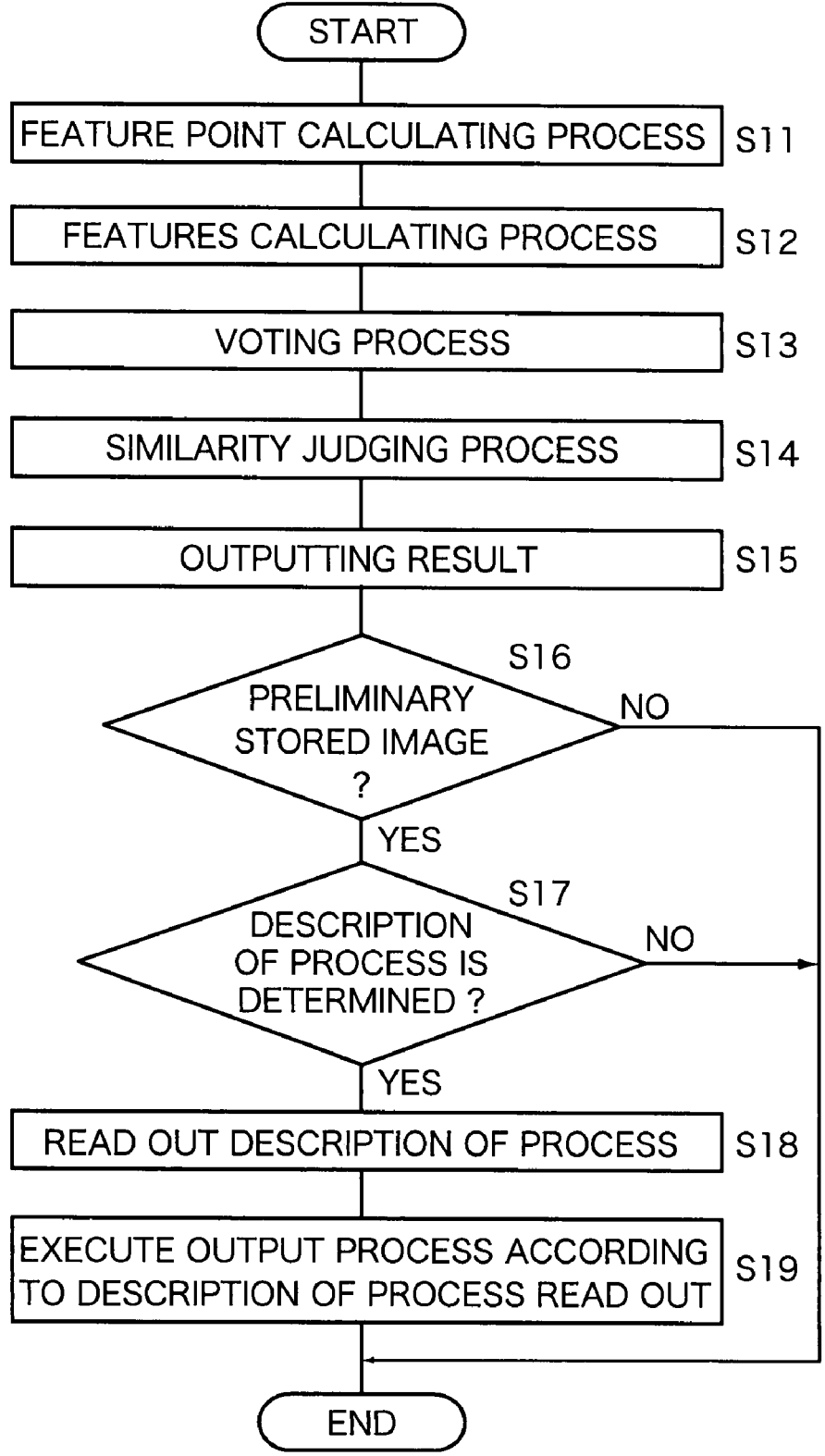
FIG. 14 is a flowchart illustrating a procedure of the processing to be executed by the image processing apparatus.

The processing to be performed by the image processing apparatus of this embodiment will be described. FIG. 14 is a flowchart illustrating a procedure of the processing of the image processing apparatus. The image data of interest received by the image input section 15 is transferred to the document matching process section 20. The feature point calculating section 21 calculates the feature points in the image data (Step S11). The feature point is determined from the centroid in a connected component in the image data. The feature points are then transferred to the features calculating section 22.

The features calculating section 22 calculates the features from the feature point received from the feature point calculating section 21 (Step S12). The features are determined as a hash value based on the distance between the feature points. The features thus determined are transferred to the voting processing section 23.

The voting processing section 23 accesses the hash table 12b according to the features (hash value) received from the features calculating section 22 to execute a voting processing for voting the index of a registered document (Step S13). In response to the result of the voting received from the voting processing section 23, the similarity judgment processor 24 examines for the similarity (Step S14) and its result is transferred to the control section 11 (Step S15).

When receiving the result from the similarity judgment processor 24, the control section 11 examines whether or not the document image of interest is similar to a stored image (a registered image) which is stored in the storage section 12 (Step S16). When it is judged that the document image is similar to none of the registered images (NO in S16), the procedure of the flowchart is terminated.

When judging that the document image is similar to one of the registered images (YES in S16), the control section 11 accesses the processing description decision table 12a to examine whether the description of the process is determined or not (Step S17). When it is judged that the description of the process is not determined (NO in S17), the procedure of the flowchart is terminated.

When judging that the description of process is determined (YES in S17), the control section 11 reads out the description of the processing from the processing description decision table 12a (Step S18) and executes the output process according to the description read out from the table (Step S19).

The above procedure is carried out during the pre-scanning of the document image. When the document is collated and found during the pre-scanning processing that its similar format has been registered with the relevant description of the processing, the description of the display section 14 displays the description of the processing for input of any command from the user. When the display exhibits no trouble, the OK button, not shown, provided on the operation section 13 is depressed. If not, the NO button, not shown, is depressed. When either of the buttons is depressed, the main scanning processing starts. When the NO button is depressed, a no-setting mode of the processing follows. Alternatively, the processing succeeding the depressing of the NO button may involve selectively setting the description of the processing. Through learning the result of modifying the description of the processing, the processing may be modified to a desired description (for example, as the number of times for selecting each description of the processing for a period of time is counted, the description of the processing which is selected at the most frequency can be used).

When the receiver (the counter party to be called or the folder where files are stored) is needed in the processing to be selectively executed (for facsimile transmission or filing), it may preliminarily be registered in the processing description decision table 112a, whereby the image data can be transmitted or transferred to the receiver. FIG. 15 is a schematic diagram showing one arrangement of the processing description decision tale 12a. FIG. 16 illustrates another arrangement of the processing description decision table 12a.

In a case where the receiver has not been registered, it may be entered by the user after the selection of the processing. For the facsimile transmission, the number of a facsimile machine at the receiver is entered prior to the processing. For the filing processing, a list of accessible folders (for example, a tree of folders) or storage devices to be communicated from the image forming apparatus (for example, a copier) are displayed on the display section 14 so that the user can select one of the folders for saving its data as a file. Alternatively, a path for the filing processing may selectively be determined.

More particularly, the folder in which the file is stored (for example, one in a tree of folders in a filing system) is provided in advance and assigned with a path along which the file is transferred before stored in the folder which has been selected. Preferably, a group of files equal in the format may be stored in a sequence in a tree of folders provided at the lower hierarchy of the folder. For instance, the number of files to be stored in one folder is predetermined and, when the number exceeds, the succeeding files are stored in another folder. This permits the files to be sorted automatically, provided that the confirmation by the user is mandatory.

In practice, the files subjected to the processing can be stored in a hard disk drive in the image forming apparatus (for example, a copier). Alternatively, the files may be stored in a server connected to the network, a USB memory, or any external hard disk drive connected over a USB interface or an IEEE1394 interface.

Figure 17:
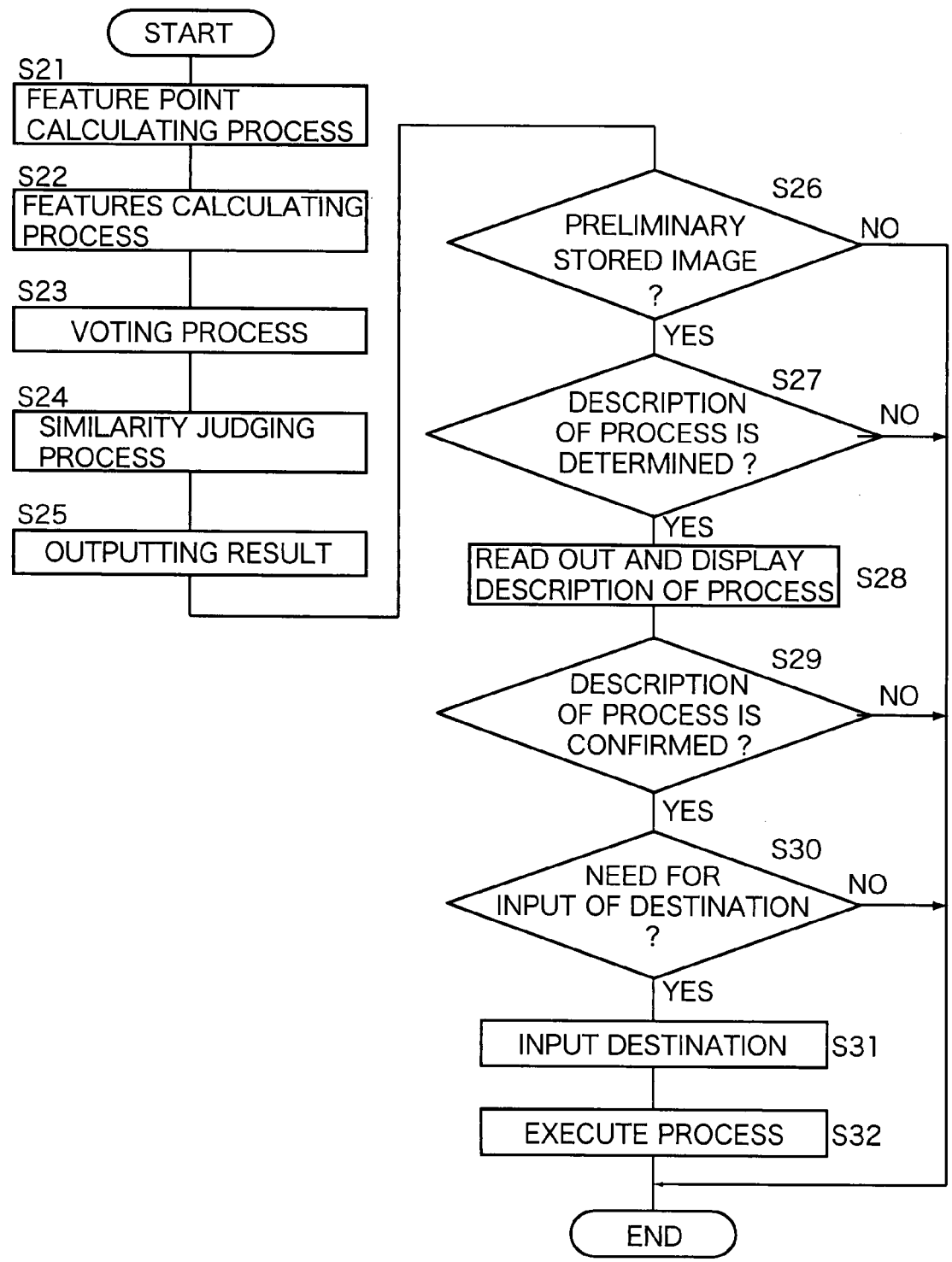
FIG. 17 is a flowchart illustrating a procedure of the processing which requires the destinations.

FIG. 17 is a flowchart showing a procedure of the processing assigned with the receiver. The image data of interest received by the image input section 15 is transferred to the document matching process section 20. The feature point calculating section 21 calculates the feature points in the image data (Step S21). The feature point is determined from the centroid in a connected component in the image data. The feature points are then transferred to the features calculating section 22.

The features calculating section 22 calculates the features from the feature point received from the feature point calculating section 21 (Step S22). The features are determined as a hash value based on the distance between the feature points. The features thus determined are transferred to the voting processing section 23.

The voting processing section 23 accesses the hash table 12b according to the features (hash value) received from the features calculating section 22 to execute a voting processing for voting the index of a registered document (Step S23). In response to the result of the voting received from the voting processing section 23, the similarity judgment processor 24 examines for the similarity (Step S24) and its result is transferred to the control section 11 (Step S25).

When receiving the result from the similarity judgment processor 24, the control section 11 examines whether or not the document image of interest is similar to a stored image (a registered image) which is stored in the storage section 12 (Step S26). When it is judged that the document image is similar to none of the registered images (NO in S26), the procedure of the flowchart is terminated.

When judging that the document image is similar to one of the registered images (YES in S26), the control section 11 accesses the processing description decision table 12a to examine whether the processing is predetermined or not (Step S27). When it is judged that the processing is not predetermined (NO in S27), the procedure of the flowchart is terminated.

When judging that the processing is predetermined (YES in S27), the control section 11 reads out the description of the processing from the processing description decision table 12a and displays the same (Step S28).

It is then examined whether or not the description of the processing is confirmed by the user operating the operation section 13 (Step S29). If the description of the processing is not confirmed (NO in S29), the procedure of the flowchart is terminated.

After judging that the description of the processing is confirmed by the user (YES in S29), it is examined whether or not the input of a destination is needed through reviewing the processing description decision table 12a (Step S30). When the processing requires no destinations to be registered or the destinations have been registered in the processing description decision table 12a as required for executing the processing, it is then judged that the input of the destination is not needed (NO in S30), the procedure of the flowchart is terminated.

When the receivers have not been registered in the processing description decision table 12a even if they are required for executing the processing, it is then judged that the input of receivers is needed (YES in S30). The input of the receivers is permitted (Step S31) and the processing is executed according to the description read out from the table (Step S32).

Embodiment 2

One embodiment of the present invention for processing document notes, which carry texts on the back side with the image processing apparatus will be described.

It is assumed that subjected to the processing are document notes which carry texts on the back side or a set of pages which carry descriptions for filling the items (referred to as filling description pages hereinafter) and pages on which the items are filled. The filling description pages carry common information and will not need to be copied, filed, or electronically transferred unless otherwise being employed as the notes to be filled. When the notes are judged carrying the filling description, their pages are indexed and assigned with its description of the processing before stored in a table so that they are inhibited to be subjected to the processing. The filling description pages may be handled as not printed pages or as if they are not present.

FIGS. 18A and 18B are explanatory views showing a document note carrying the filling description on the back side and its processing. When a set of the document notes are provided carrying the entry on the front side and the filling description on the back side (See FIGS. 18A and 18B), their front sides are subjected to the processing and their back sides are treated as not printed pages. In a copier, for example, the front sides are copied while the back sides are directly passed (but not scanned) before dispatched out (FIG. 18B).

Figure 19A:
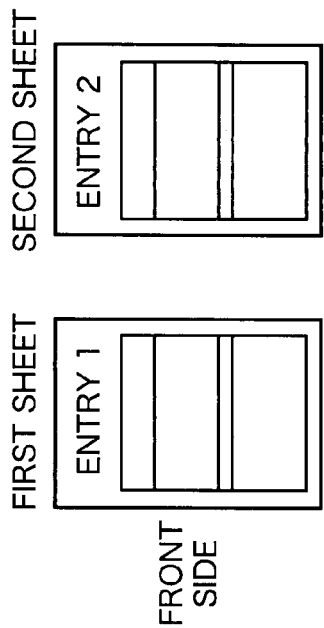
FIGS. 19A and 19B are explanatory views showing a set of identical document notes which carry the description on the back side and a processing of the set.
Figure 19B:
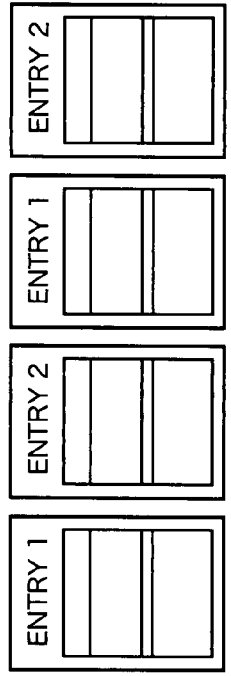
Figure 19B:
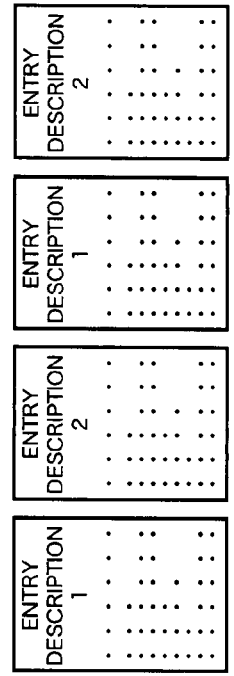
Figure 19B:
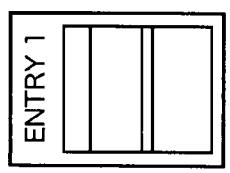
Figure 19B:
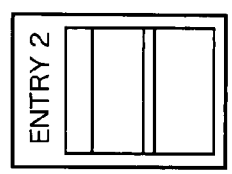

FIGS. 19A and 19B are explanatory views showing a set of identical document notes carrying the filling description on the back side and their processing. As shown in FIG. 19A, the document notes are subjected not at their description page to the processing but at the front page one after another (FIG. 19B).

Figure 20A:
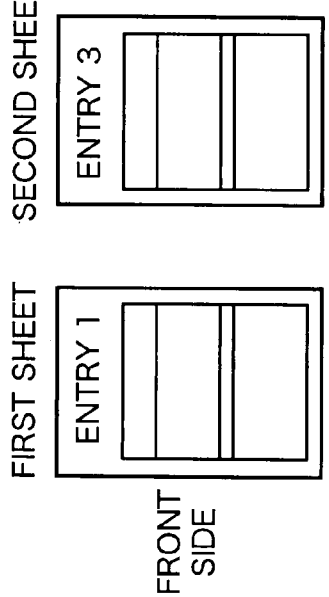
FIGS. 20A and 20B are explanatory views showing a set of different document note and a processing of the set.
Figure 20B:
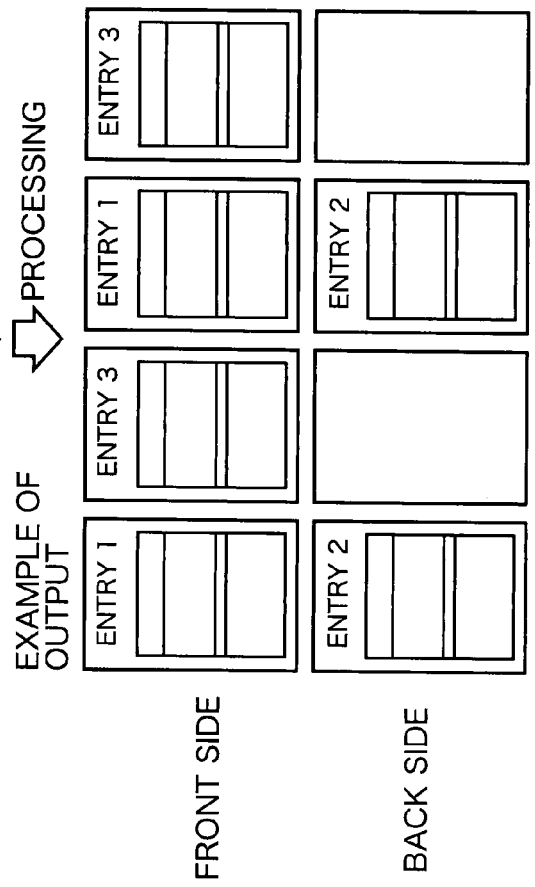

FIGS. 20A and 20B are explanatory views showing a set of different document notes and their processing. As shown in FIG. 20A, sets of the different document notes, where the filling description is printed on the last page or the back side of the last page, are subjected to a both-side copying processing but not the last page or the back side of the last page (FIG. 20B).

In a case where the document notes are copied, filed, or electronically transferred one by one, their pages defined as the not printed pages are not dispatched out in the processing shown in FIG. 18 or 20.

As described above, the image of each document is assigned with two different descriptions of the processing. The selection of the processing from the two different descriptions is carried out by the control section 11 depending on the mode of the processing (filing, and electronic transferring) to be executed.

Embodiment 3

Although Embodiment 2 is described with the use of document notes carrying the filling description, it may be applied to a processing of utilizing the blank side of a print but not the filling description page.

It has recently been known, in view of the global environmental protection, the effective use of limited sources, or the cost saving, that the black or back side of a print, not an official print, is used for copying and printing with a copier or a printer. Since the data printed on the back side of a print is generally unnecessary, it may be memorized as an unwanted pattern and not subjected to the processing (for copying, filing, or facsimile transmission).

Embodiment 4

Every applicable e-documentation standard is based on the guide line of officials and may be limited (or restricted) in the legibility, the perfection, the secrecy, and the accessibility depending on the form of documents and the type of receivers. The legibility is defined by the number of colors, the resolution, and gamma value. The perfection is determined by the electronic signature and the time stamp. The secrecy is protected with the encryption. The accessibility is defined by the technical specifications of OCR. FIG. 21 illustrates a table showing one example of the guide line for an e-documentation standard.

Figure 22:
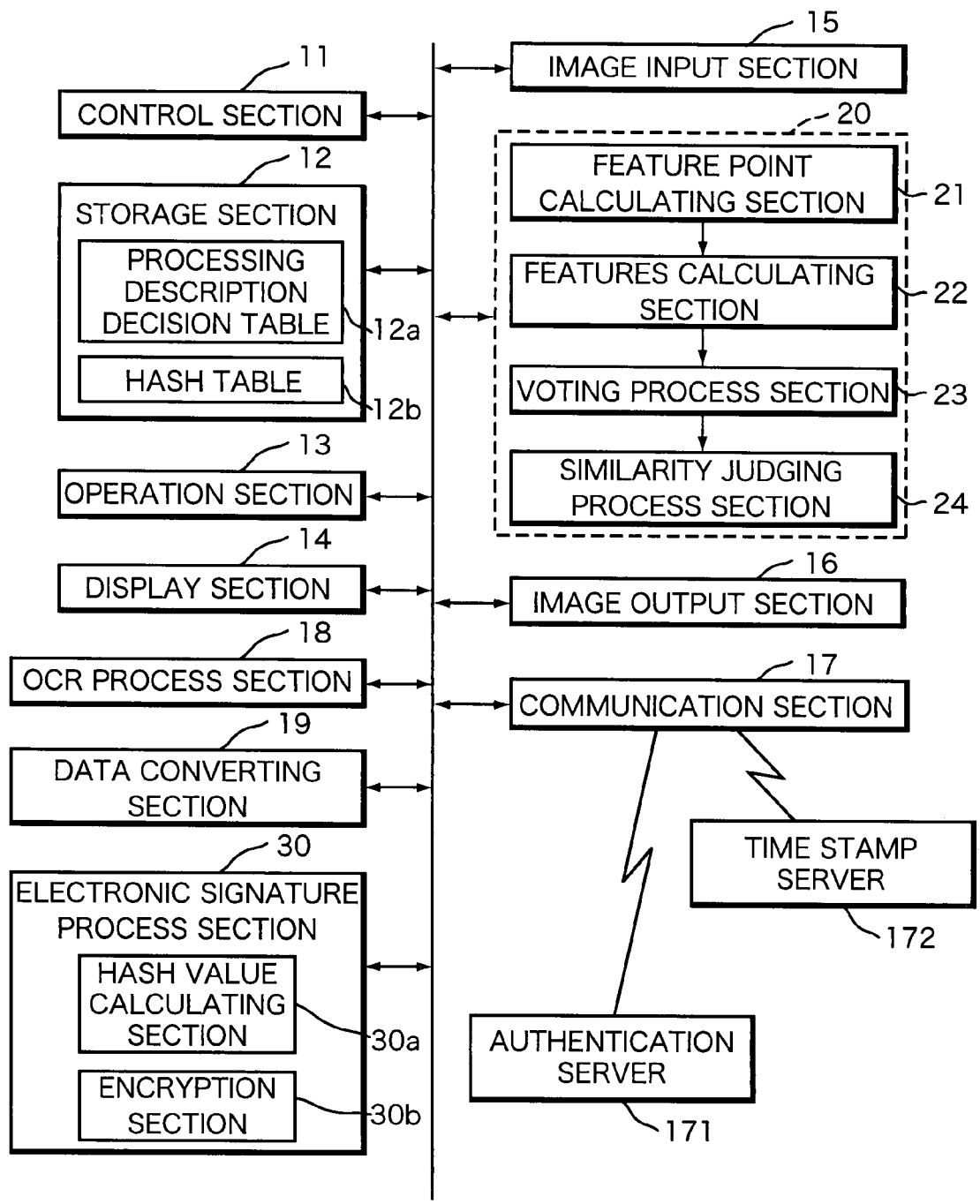
FIG. 22 is a block diagram showing an internal arrangement of the image processing apparatus of another embodiment.

FIG. 22 is a block diagram showing the internal arrangement of an image processing apparatus of this embodiment. The image processing apparatus of this embodiment includes, similar to those of Embodiment 1, a control section 11, a storage section 12, an operation section 13, a display section 14, an image input section 15, an image output section 16, a communication section 17, and a document matching process section 20. In addition, an OCR process section 18, a data converting section 19, and an electronic signature process section 30 are provided. The communication section 17 is accompanied with an authentication server 171 and a time stamp server 172.

The requirements for satisfying the legibility, the perfection, the secrecy, and the accessibility of the format of document controlled by the e-documentation standard are registered in advance in the image processing apparatus. It is assumed, for example, that the format of a document (document A) is specified with 24-bit RGB color for the legibility (256 gray levels in each of RGB colors), 200 dpi of the resolution, 1.0 of the gamma value, electronic signature and time stamp for the perfection, encryption for the secrecy, and OCR application for the accessibility. Also, the format of another document (document B) is specified with monochromatic binary for the legibility, 200 dpi of the resolution, electronic signature and time stamp for the perfection, and OCR application for the accessibility.

Figure 23:
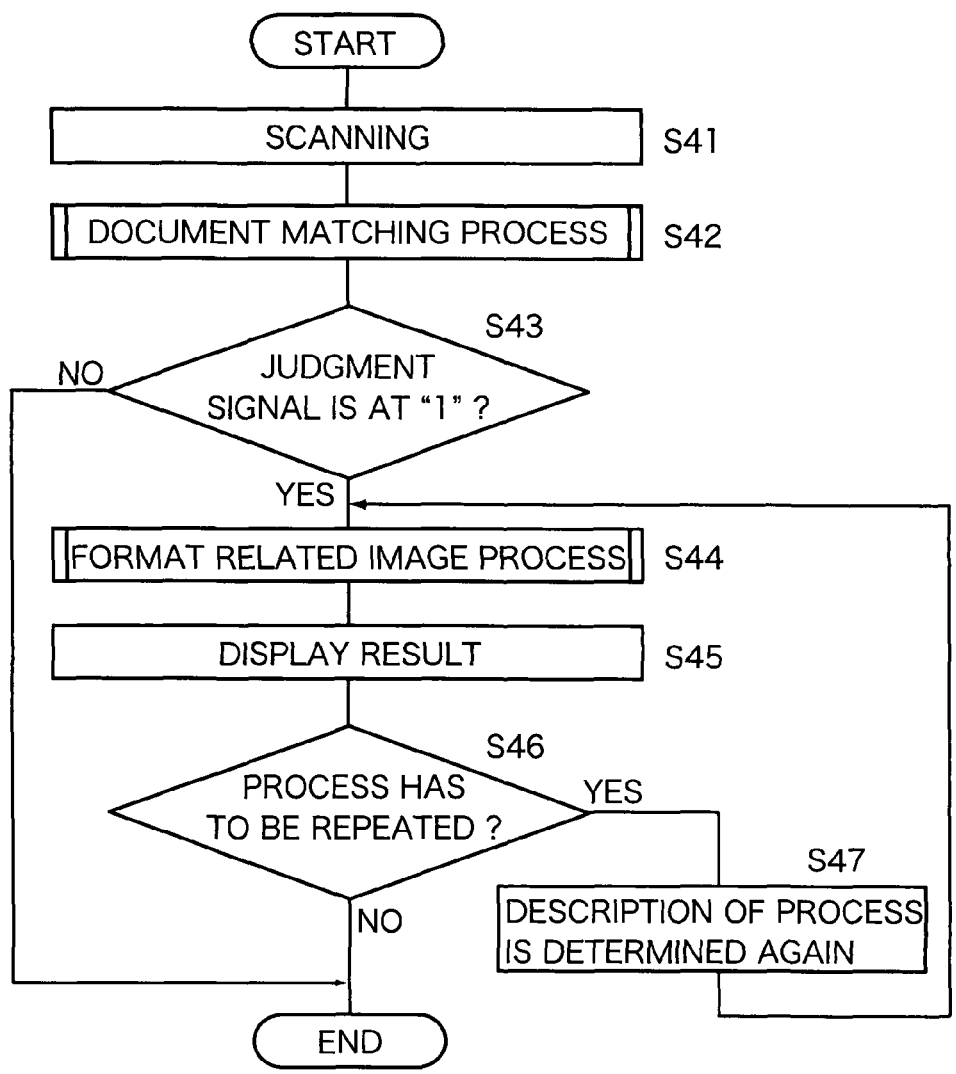
FIG. 23 is a flowchart illustrating a procedure of the processing to be executed by the image processing apparatus.

The processing will now be described. FIG. 23 is a flowchart showing a procedure of the processing to be executed by the image processing apparatus. The procedure starts with scanning the document of interest to produce an electronic form of its image data in the image input section 15 (Step S41). The scanning processing is carried out under conditions satisfying the foregoing requirements registered in advance, for example, at 600 dpi in RGB colors. The image data (with shading correction) is then stored in the storage section 12 and transferred to the document matching process section 20 where it is subjected to the document matching process (Step S42).

Figure 24:
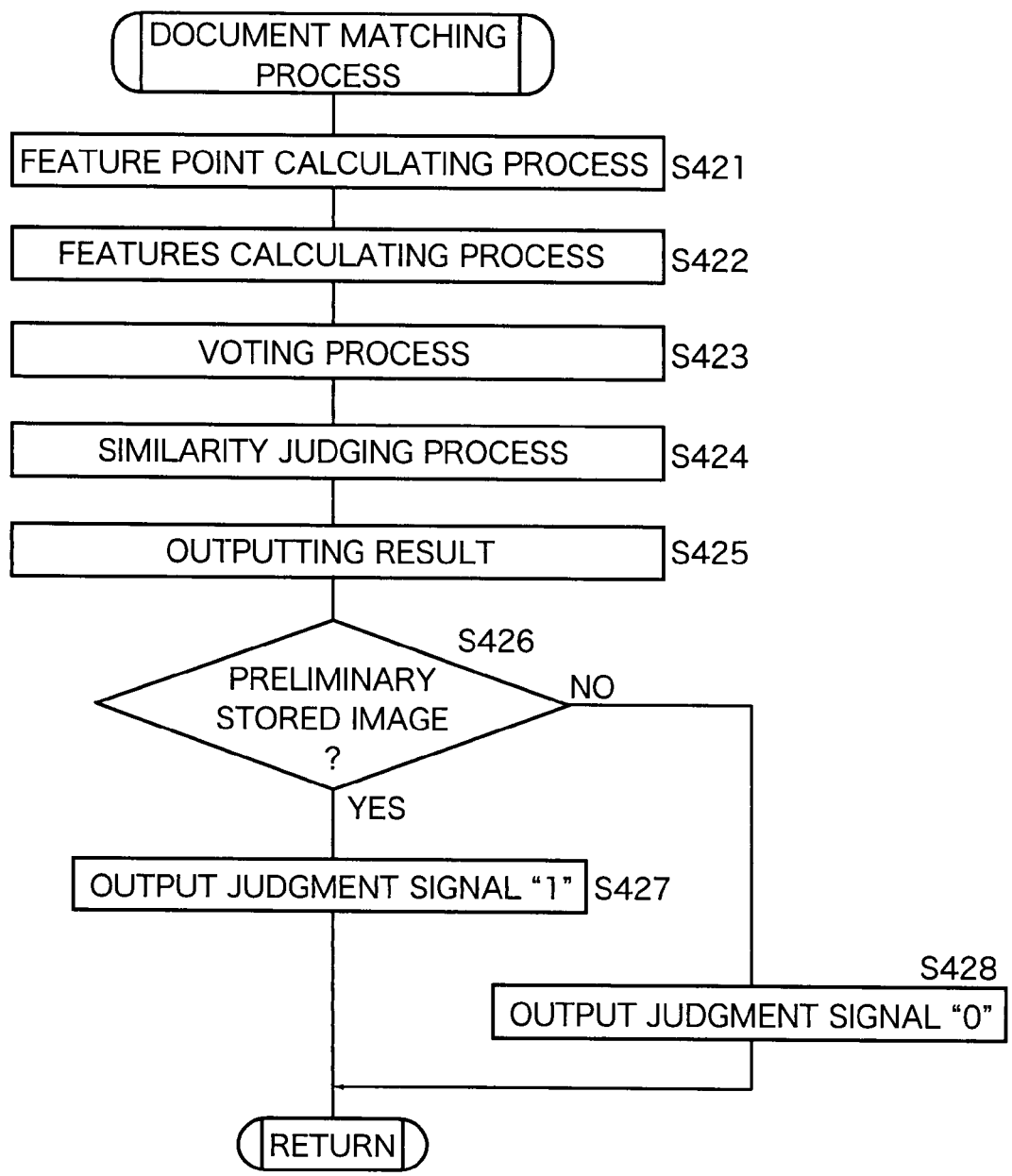
FIG. 24 is a flowchart illustrating a procedure of the document matching process.

FIG. 24 is a flowchart showing a procedure of the document matching process. The document matching process starts with calculating the feature points in the image data of interest (Step S421). The feature point is determined from the centroid in a connected component in the image data, as described above. The feature points are then transferred to the features calculating section 22.

The features calculating section 22 calculates the features from the feature point received from the feature point calculating section 21 (Step S422). The features are determined as an unchanged measurement (hash value) based on the distance between the feature points, which remains unchanged at any geometric change of the image including rotation, parallel movement, and enlargement/reduction. The features thus determined are transferred to the voting processing section 23.

The voting processing section 23 accesses the hash table 12b according to the features (hash value) received from the features calculating section 22 to execute a voting processing for voting the index of a registered document (Step S423). In response to the result of the voting received from the voting processing section 23, the similarity judgment processor 24 examines for the similarity (Step S424) and its result is transferred to the control section 11 (Step S425).

When receiving the result from the similarity judgment processor 24, the control section 11 examines whether or not the document image of interest is similar to a stored image (a registered image) which is stored in the storage section 12 (Step S426). When judging that the document image is similar to one of the registered images (YES in S426), the control section 11 outputs a judgment signal "1" (Step S427). When judging that the image is similar to none of the registered images (NO in S416), the control section 11 releases a judgment signal "0" (Step S428). When the judgment signal has been released, the procedure returns back to the flowchart shown in FIG. 23.

The control section 11 in the image processing apparatus then examines whether or not the judgment signal produced from the result of the document matching process in Step S42 is at "1" (Step S43). When judging that the judgment signal is at "1" (YES in S43), the control section 11 proceeds the format related image process, described later (Step S44). When judging that the judgment signal is at "1" (YES in S43), the control section 11 proceeds the format related image When judging that the judgment signal is not at "1" (NO in Step 43), the control section 11 closes the procedure of the flowchart.

Figure 25:
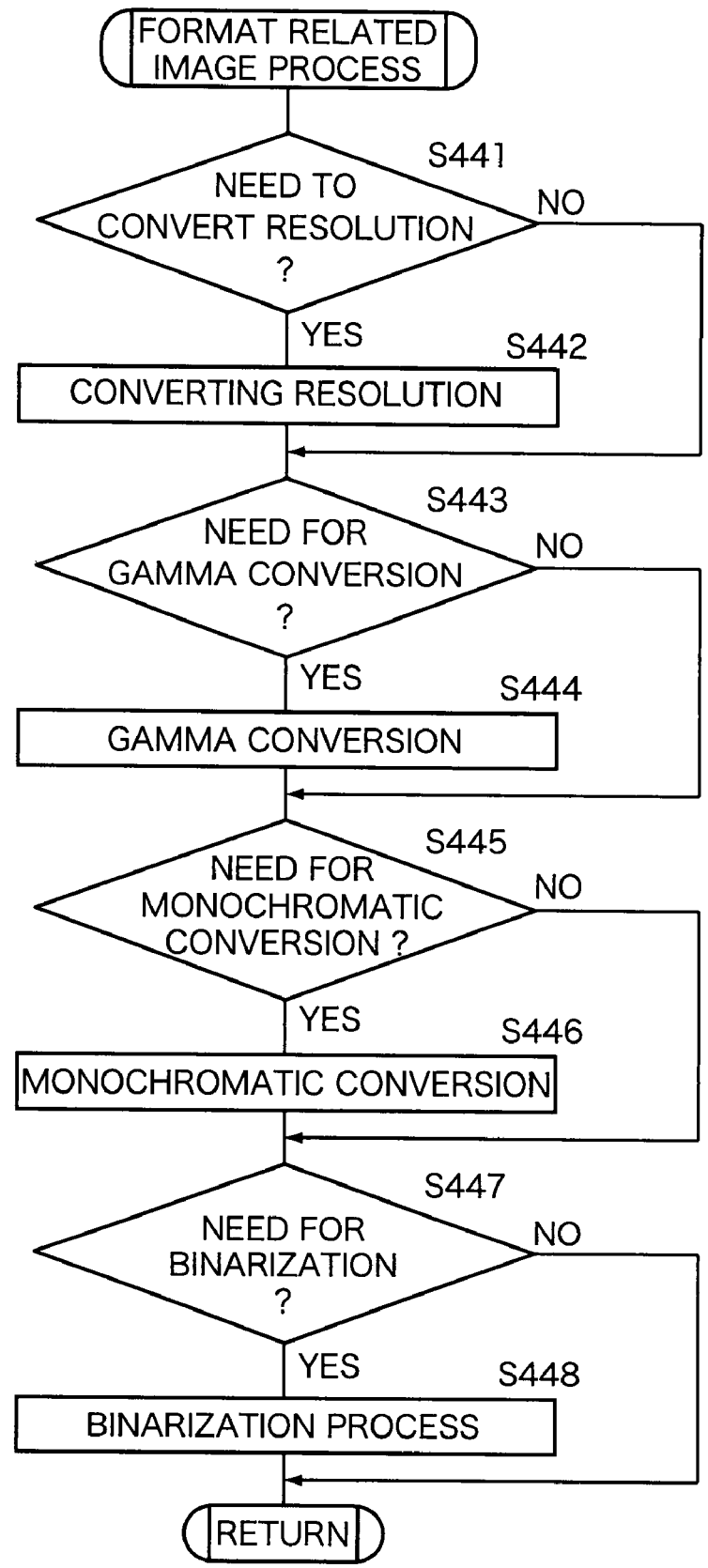
FIG. 25 is a flowchart illustrating a procedure of the text related image processing.

FIG. 25 is a flowchart showing a procedure of the format related image process. The procedure starts with examining whether or not the converting of the resolution is needed (Step S441). For example, when the image data received from the image input section 15 is at 300 dpi of the resolution and one of the registered images judged in Step S426 is equal in the format to the document A, it has to be shifted to 200 dpi equal to that of the document A. when judging that the converting of the resolution is needed (YES in S441), the control section 11 executes the processing of converting the resolution (Step S442). This step may be followed by the other processings of output tone correction and tone reproduction. Alternatively, the step of modifying the resolution may be preceded by the other processings of input tone correction, segmentation process, color correction, under-color removal for generation of black color, and spatial filter process.

After the processing of converting the resolution (S442) or when judging that the processing of converting the resolution is not needed (NO in S441), the control section 11 examines whether the gamma conversion is needed or not (Step S443). When it is judged that the gamma conversion is needed (YES in S443), the step of executing the gamma conversion follows (Step S444).

After the step of executing the gamma conversion (S444) or when judging that the gamma conversion is not needed (NO in S443), the control section 11 further examines whether the monochromatic conversion is needed or not (Step S445). When it is judged that the monochromatic conversion is needed (YES in S445), the step follows for executing the monochromatic conversion through achromatic processing (Step S446). The achromatic processing involves converting the image into a monochromatic data using the equation $Y_j = 0.30 R_j + 0.59 G_j + 0.11 B_j$.

After the monochromatic conversion (S446) or judging that the monochromatic conversion is not needed (NO in S445), the control section 11 further examines whether the binarization process is needed or not (Step S447). When it is judged that the binarization process is needed (YES in S447), the step follows for executing the binarization process through dithering, error diffusion, and threshold value processing (using a threshold value of 128) (Step S448).

After the binarization process (S448) or it is judged that the binarization process is not needed (NO in S447), the procedure of the flowchart is terminated.

Following the format related image process (S44), the step is carried out for displaying the result on the display section 14 to examine whether or not the processing has done correctly (Step S45). More particularly, it is examined whether or not the resolution, the gray level, the scanning of a document are adequate. At the time, the description of the processing (including the resolution and the gray level) is displayed together with the image which has been subjected to the processing.

This is followed by examining whether the processing has to be repeated or not (Step S46). When it is judged that the processing needs not to be repeated (NO in S46), the procedure of the flowchart is terminated. When it is judged that the processing has to be repeated because, for example, the characters in the image are scarcely legible (YES in S46), the procedure goes to a step S47 for determining the description of the process again such as modifying the resolution. Then, the format related image process (S44) is repeated for producing an acceptable degree of the image.

The images subjected to the processing are stored together with the condition data for the processing in the storage section 12 and, when desired, displayed in a sequence. Alternatively, a couple of the images may be displayed at once for ease of the selection. The foregoing processing may be executed by the image processing apparatus or its resultant images together with the condition data for the processing may be transferred to a computer of the user for allowing the user to select desired one of the images. The selected image is then returned back to the image processing apparatus or further transferred to an applicable server for storage.

Fundamentally, the condition data for the processing depends on the guide line of officials. In a case where the conditions for subjecting a particular document to the processing have to be preset separately, they may be modified, for example, by increasing the resolution, and displayed for ease of the understanding, thus contributing to the improvement of the efficiency of a routine working processing such as booking.

Although the processing described above involves temporarily saving the image data produced from the scanned document image in the storage section 12 such as a hard disk drive for use in the processing in the future, it may be carried out by pre-scanning the document for the document matching process and, when it is judged from the result of the document matching process that the document is a text to be controlled by the e-documentation standard, subjecting the document to the main scanning processing before executing the image processing. In the latter case, the processing at the document matching process section 20 is bypassed through.

Since the document to be controlled by the e-documentation standard is specified with the OCR application for the accessibility, its binarized image data is subjected to a character recognizing processing of the OCR processor 18 allowing the document accompanied with the result of the recognition. The image data subjected to the OCR processing is then converted to, for example, a PDF file which is stored in the storage section 12.

Also, the document to be controlled by the e-documentation standard has to be identified with an electronic signature and a time stamp. Prior to the processing of a particular mode selectively determined, the document to be controlled by the e-documentation standard is assigned with an electronic signature and a time stamp at the initial setting. If none of electronic signature and time stamp is needed, its instruction may be entered from the operation section 13 (for example, by pressing down a button commanding no need of signature and time stamp). Moreover, the processing of the scanner may be preset by a computer entering from the screen of setting the scanning or reading conditions.

The method of assigning an electronic signature involves, when the image data is of a PDF file (satisfying the relevant conditions and subjected to the processing), calculating a hash value with the hash function of a hash value calculating section 30a in the electronic signature process section 30 before saving in the storage section 12 and subjecting the same to the encrypting processing of an encryption section 30b using the hidden key of a signature owner for producing a signature. Then, the PDF file is accompanied with the signature and an electronic certificate issued by the authentication server 171 examining the public key of the signature owner to produce image data with the electronic signature.

Similarly, the method of applying a time stamp involves calculating a hash value with the hash function of the hash value calculating section 30a in the electronic signature process section 30 before transferring to the time server 172. The hash value received by the time server 172 is encrypted using the hidden key of a time stamp server for producing a time stamp which is then transferred back to the image processing apparatus before stored in its storage section 12. The time stamp is attached to the image data accompanied with the electronic signature.

When another encrypting processing is needed for the secrecy, it may be executed by either a public key technique similar to that for the electronic signature or a hidden key technique.

Embodiment 5

During a common scanning processing, the scanned data of a document placed on the scanning table may be lost partially when it is positioned not properly. It is also known that the scanned data is intentionally deleted at the edge for eliminating the shadings at the edge. This will interrupt a data (such as a tally impression) at the edge of the document. The scanning processing conforming to the e-documentation standard should cover the entirety of the document.

Figure 26:
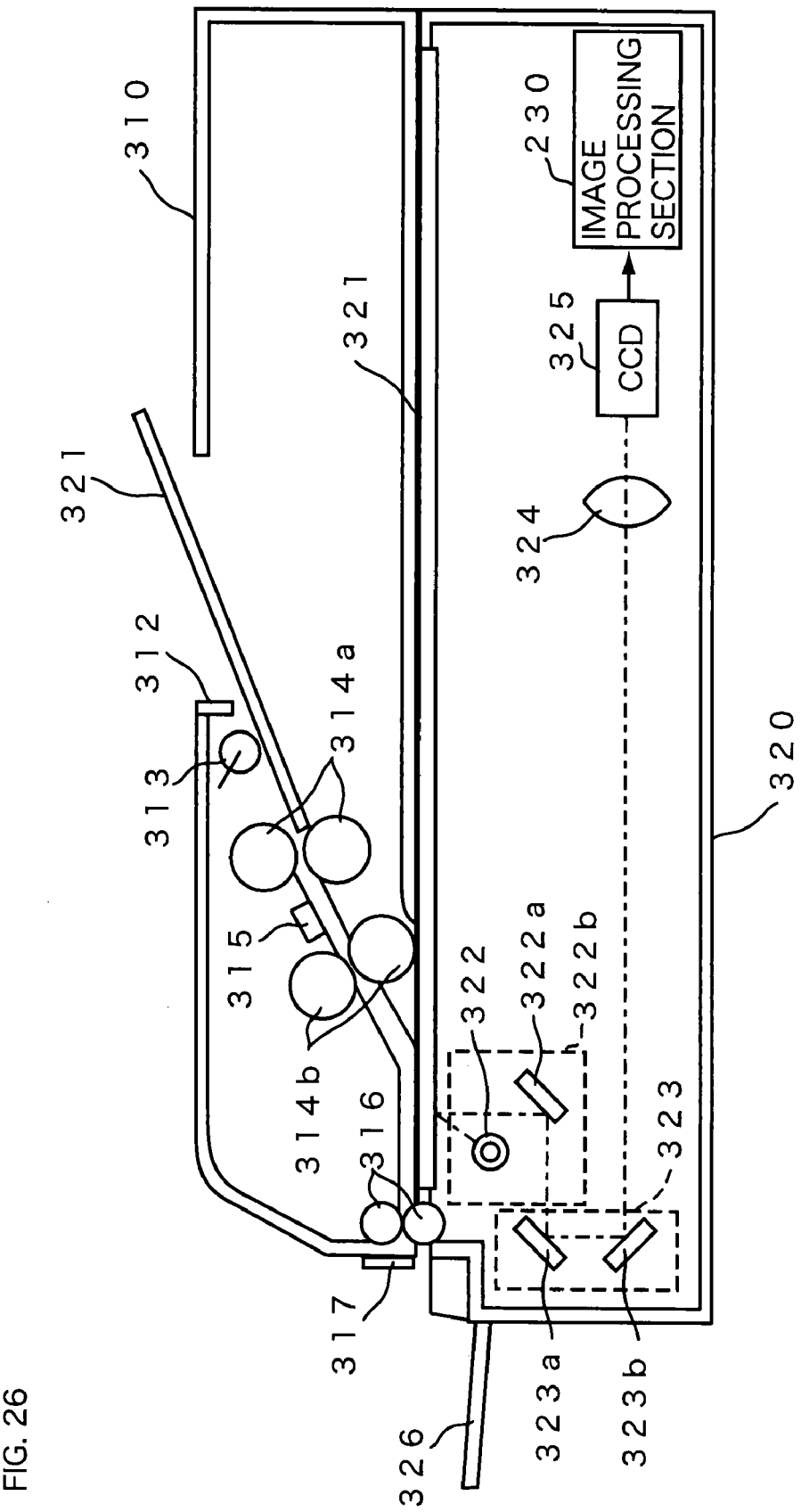
FIG. 26 is a schematic view of an arrangement of the image reading apparatus showing one embodiment of the present invention.

FIG. 26 is a schematic view of an image reading apparatus showing this embodiment of the present invention. The image reading apparatus includes substantially a document transfer module 310 acting as an upper housing and a scanner module 320 acting as a lower housing.

The document transfer module 310 includes a document set sensor 312 for detecting a document placed on a document tray 311, an in-feed roller 313 for conveying the documents one by one, a couple of transfer rollers 314a, 314b for conveying the document for reading an image from the document, a document discharge roller 316 for discharging the document, and a document discharge sensor 317 for detecting the document being discharged. The transfer roller (match roller) 314b is equipped with an electromagnetic clutch (not shown) provided on its driving shaft for transmitting the driving force from a drive motor (not shown) and arranged to remain not driven when the document is not present. When receiving a signal from a transfer timing sensor 315 which detects the leading end of the document, the transfer roller 314b starts rotating in a direction of conveying the document towards the downstream. More particularly, the transfer roller 314b starts rotating in the direction of conveying the document towards the downstream when the leading end of the document conveyed from the upstream has struck against the nip portion of the transfer roller 314b and deflected to a proper degree. At the time, the nip portion of the transfer roller 314b causes the leading end of the document to extend at a right angle to the direction of conveying.

The scanner module 320 includes a pair of scanning sections 322, 323 which can travel forward and backward along and in parallel with the lower side of a document table 321, a focusing lens 324, a CCD line sensor 325 made of optoelectric converter devices, and a discharge tray 326. The scanning section 322 contains a light source 322a (for example, a halogen lamp) for illuminating the document placed on the document table 321 and a mirror 322b for directing the reflection of light reflected by the document to the light path. The scanning section 323 contains a couple of mirrors 323a, 323b for directing the reflection of light reflected by the document to desired directions.

The focusing lens 324 is provided for focusing the reflection of light received from the scanning section 323 at a predetermined location on the CCD line sensor 325. The CCD line sensor 325 optoelectrically converts the focused image into an electric signal. More specifically, the color image is produced from (namely the upper side of) the document, divided into R(red), G(green), and B(blue) color components, and transferred to an image processing section 230 which will be described later.

Figure 27:
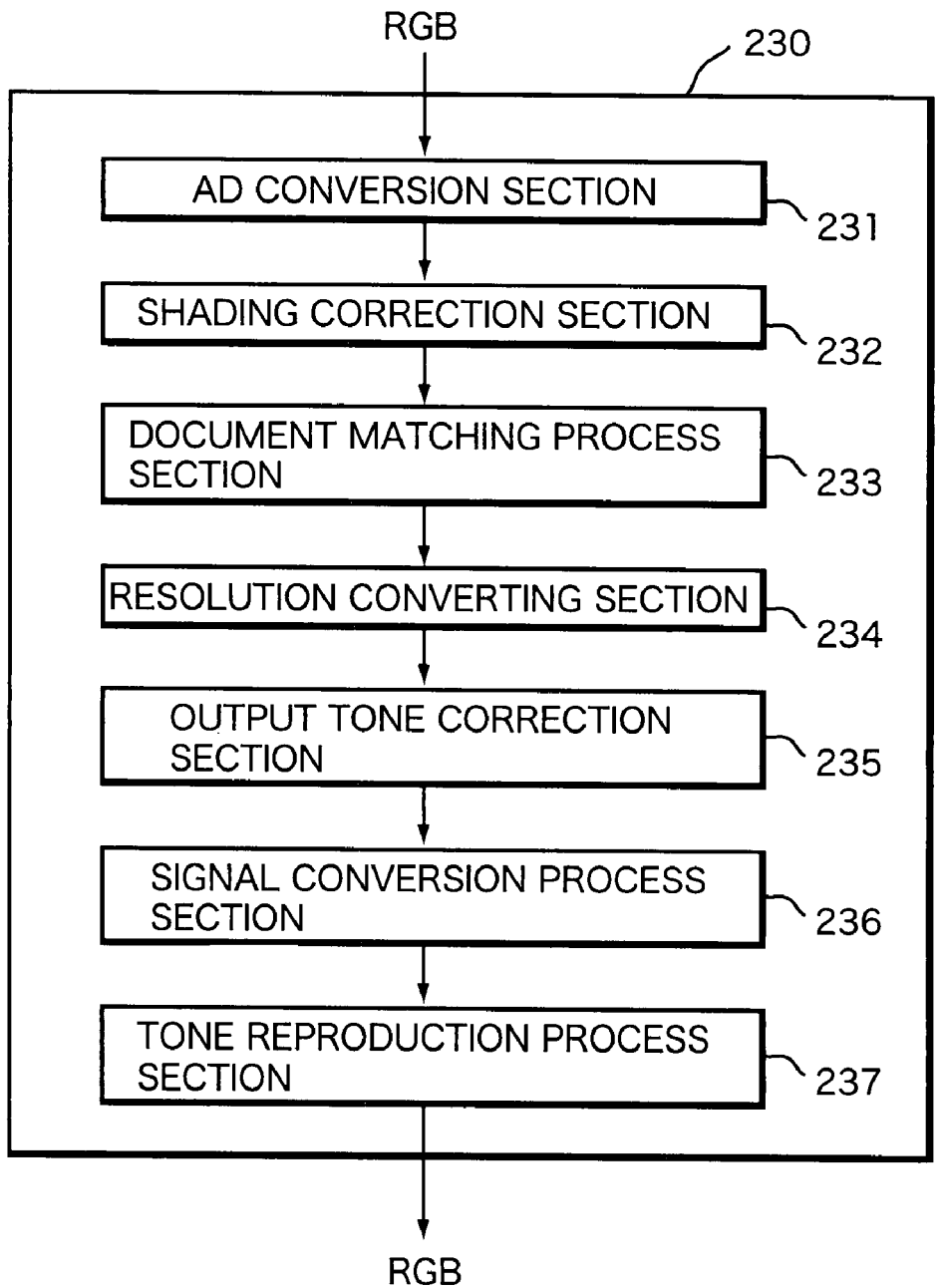
FIG. 27 is a block diagram showing an internal arrangement of the image processing section.

FIG. 27 is a block diagram showing an internal arrangement of the image processing section 230. The image processing section 230 includes an AD converting section 231, a shading correction section 232, a document matching process section 233, a resolution converting section 234, an output tone correction section 235, a signal conversion section 236, and a tone reproduction process section 237.

The AD converting section 231 is provided for converting an analog RGB signal produced by the CCD line sensor 325 in the scanner module 320 into a digital signal (of the image data). The shading correction section 232 is provided for removing various faults, which have been developed in the illumination system, the image focusing system, and the image sensing system, from the digital RGB signal received from the AD converting section 231. The shading correction section 232 also executes a color balancing processing. In the shading correction section 232, a reflection rate signal of the RGB image is converted into a density signal which is transferred to the document matching process section 233 and simultaneously stored in a memory not shown.

The document matching process section 233 is provided for executing the feature point calculating processing described with Embodiment 1 and examining the similarity with the text image data registered in advance from the result of the feature point calculating processing. When it is judged that the document is a document controlled by the e-documentation standard, its description of the processing is displayed on a display not shown for requesting the confirmation of the user.

The resolution converting section 234 is provided for modifying the resolution of the RGB signal read out from the memory with an applicable technique such as nearest neighbor method, bilinear method, or bi-cubic method. The output tone correction section 235 carries out a tone correction processing with the gamma value registered and, when a monochromatic binary form is requested as the format to be submitted, the signal conversion section 236 converts the RGB signal into an achromatic signal which is then subjected to a binarizing processing of the tone reproduction process section 237. When no monochromatic binary data is required, the processings of the signal conversion section 236 and the tone reproduction process section 237 are bypassed through.

The image data after the above steps may be transferred to an image forming apparatus such as a printer or a digital multi function printer, or to a desired server where it is stored.

In the common scanning processing, when the document is placed improperly on the document table 321, its scanned data may be lost partially. It is also known that the scanned data is intentionally deleted at the edge for eliminating the shadings at the edge. This will interrupt a data (such as a tally impression) at the edge of the document. The scanning processing conforming to the e-documentation standard should cover the entirety of the document.

Figure 28:
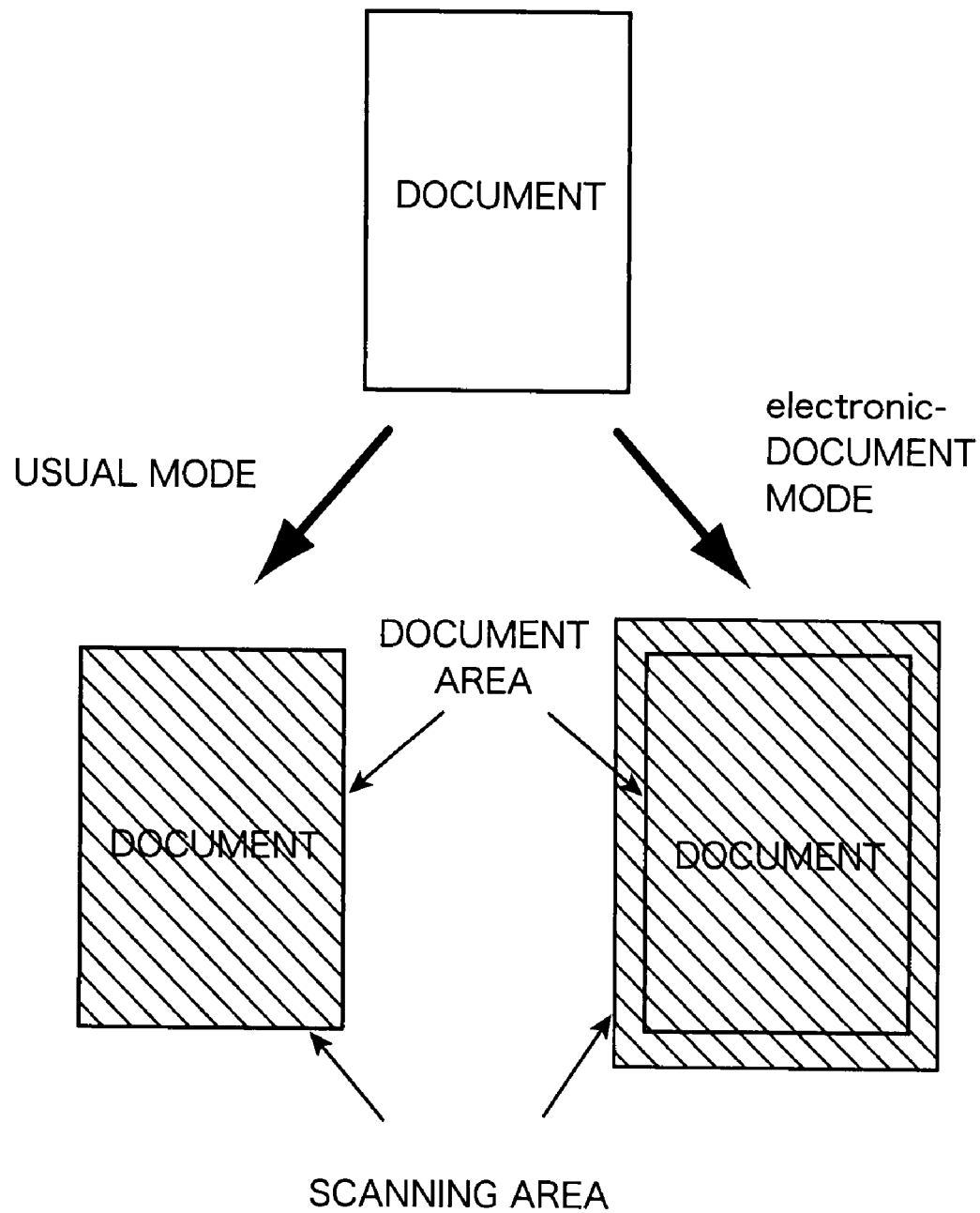
FIG. 28 is an explanatory view showing a scanning area of a document image.
Figure 29A:
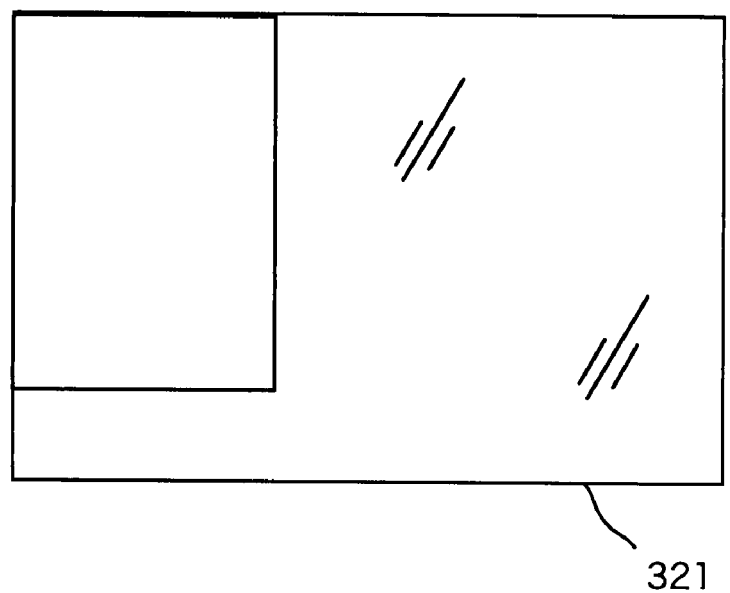
FIGS. 29A and 29B are explanatory view showing placement on a document table.
Figure 29B:
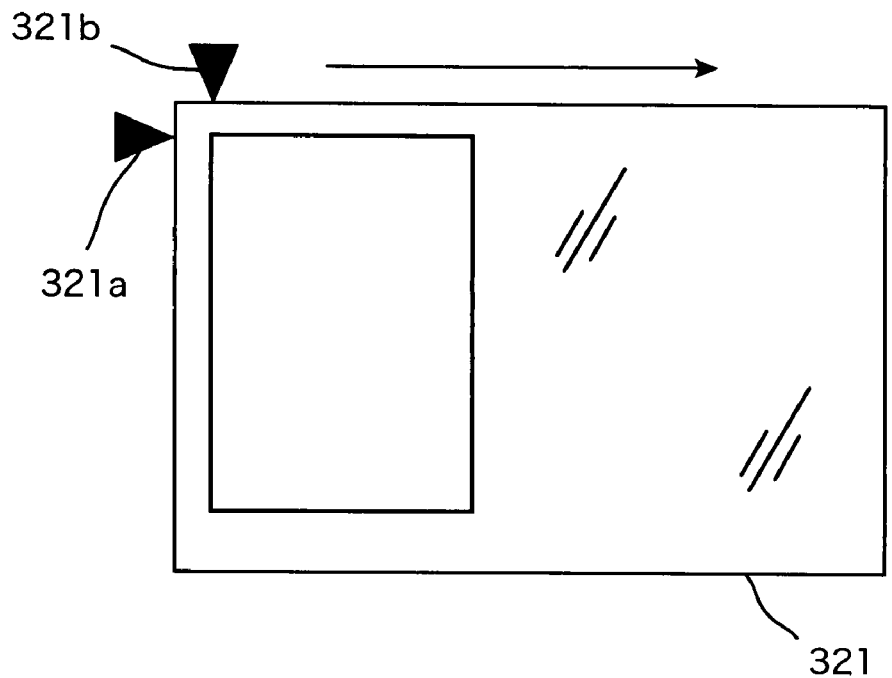

FIG. 28 is an explanatory view illustrating the area of scanning over the document. FIGS. 29A and 29B are explanatory views showing the placement of the document on the document table 321. In general, the scanning processing is made with the document aligned with the edge of the document table 321 (See FIG. 29A). In the e-documentation mode, the document is placed on the document table 321 as aligned with positional markings 321a, 321b for being scanned without error.

It is thus favorable to provide a mode of the processing (for example, termed an e-documentation mode) dedicated to the e-documentation standard which is then selectively determined from the operation panel of the image reading apparatus. If the processing of the image reading apparatus is controlled by a computer, the mode can be selected from the setting menu screen of a display in the computer. For example, when the document is placed at the center of an automatic document feeder (ADF), its scanning processing can be started earlier in synchronization with the timing for conveying the document thus to provide an over-scanning mode.

Alternatively, the over-scanning mode may be applied to any other documents conforming to the e-documentation standard than the document to be over scanned.

Prior to the scanning processing in the mode for processing the documents controlled by the e-documentation standard, the description of the processing is preset through the document matching process. In particular, the document is placed on the document table 321 with its edges not outside of but aligned with the markings 321a, 321b as shown in FIG. 29B.

Embodiment 6

The present invention is equally applicable to an image forming apparatus which is a combination of the scanner apparatus (an image input apparatus) or the printer apparatus (an image output apparatus).

Figure 30:
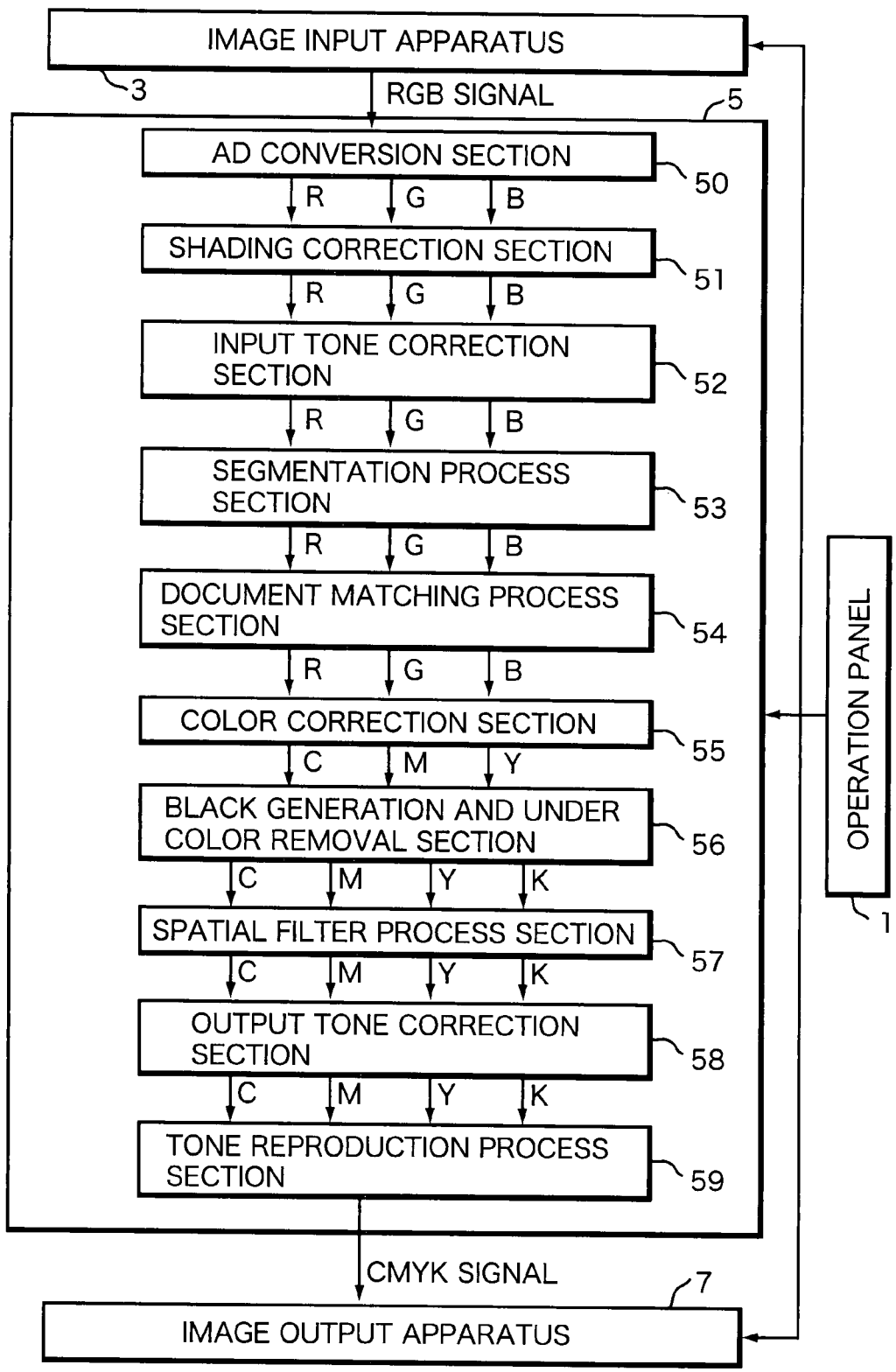
FIG. 30 is a block diagram of an internal arrangement of the image forming apparatus showing one embodiment of the present invention.

FIG. 30 is a block diagram illustrating an internal arrangement of the image forming apparatus of this embodiment. The image forming apparatus of this embodiment includes an operation panel 1, an image input apparatus 3, an image processing apparatus 5, and an image output apparatus 7.

The operation panel 1 includes an array of switches and button controls for entering various instructions and selects from the user and a liquid crystal display for displaying the data to be notified to the user.

The image input apparatus 3 is a means for optically reading a document image, including a light source for illuminating the document to be read and an image sensor such as CCD (charged coupled device). The image input apparatus 3 focuses the reflection of light reflected by the document placed at the scanning position on the image sensor to produce an analog electric signal of the RGB colors (R: red, G: green, and B: blue). The analog electric signal produced by the image input apparatus 3 is then transferred to the image processing apparatus 5.

The image processing apparatus 5 converts the analog electric signal received from the image input apparatus 3 into a digital electric signal and examines whether or not the signal contains a particular color component. When the signal contains a particular color component, it is subjected to a color correction process before released as an image signal. The image signal is then transferred to the image output apparatus 7. In this embodiment, the image signal is based on a CMYK form (C: cyan, M: magenta, Y: yellow, and K: black). The internal arrangement of the image processing apparatus 5 will be described later in more detail.

The image output apparatus 7 is a means for producing a visual image on a sheet of paper or OHP film from the image signal received from the image processing apparatus 5. For the purpose, the image output apparatus 7 includes a charger for charging a photo-sensitive drum to a desired potential, a laser writer for emitting a beam of laser according to the image data received from the outside to develop a static latent image on the photo-sensitive drum, a developer for applying toner to the static latent image developed on the photo-sensitive drum for visualization, and a transfer device (not shown) for transferring the toner image from the photo-sensitive drum to the sheet, whereby the user can print the image on the sheet using the electronic photography technique. The electronic photography technology employed in the laser type of the image reading apparatus may be replaced by any other applicable method such as ink-jet printing, thermal printing, or sublimation printing.

The internal arrangement of the image processing apparatus 5 will now be described. The image processing apparatus 5 includes an AD converting section 50, a shading correction section 51, an input tone correction section 52, a segmentation process section 53, a document matching process section 54, a color correction section 55, a black generation and under color removal section 56, a spatial filter process section 57, an output tone correction section 58, and a tone reproduction processing section 59.

The AD converting section 50 is provided for converting an analog RGB signal received from the image input apparatus 3 into a digital signal. The shading correction section 51 is provided for removing various faults, which have been developed in the illumination system, the focusing system, and the image sensing system, from the digital RGB signal received from the AD converting section 50. The shading correction section 51 also executes a color balancing processing.

The input tone correction section 52 is provided for executing an image quality controlling processing such as removal of the page background density or adjustment of the contrast.

The regions separation processing section 53 is provided for separating the pixels in the input image of the RGB signal into character (text) regions, halftone regions, or photograph regions. The segmentation process section 53 produces from the result of the separation processing a segmentation class signal which indicates the region to which the pixels are assigned before delivering the signal to the black generation and under color removal section 56, the spatial filter process section 57, and the tone reproduction processing section 59 at the succeeding steps while transfers the input signal received from the input tone correction section 52 directly to the document matching process section 54.

The document matching process section 54 is provided for executing the feature point calculating processing described with Embodiment 1 and examining the similarity with the text image data registered in advance from the result of the feature point calculating processing. When judging that the document is similar as assigned with the description of the processing, the document matching process section 54 displays the description of the processing on a display in the display panel 1 for permitting the user to enter a command and carries out the processing upon receiving the command. The document matching process section 54 may be connected in parallel with the input tone correction section 52 but not at the downstream of the segmentation process section 53.

The color correction section 55 is provided for removing color impurity derived from the spectral characteristics of the CMY color components including unless absorption component to ensure the fidelity of color reproduction. The black generation and under color removal section 56 executes a black generating processing for producing the black (K) signal from the three color, CMY, signals after the color correction and subtracting the K signal from the CMY signals to produce new CMY signals. This allows the three color, CMY, signals to be converted into four, CMYK, signals.

The black generating processing may be, for example, a (common) skeleton black technique. Assuming that the input/output character of a skeleton curve is denoted by y=f(x), the input data are C, M. and Y, the output data are C', M', and Y', and the UCR (under color removal) rate is α (0<α<1), the black generation and under color removal process is expressed by $$K'=f\{\min(C,M,Y)\},$$

$$C'=C-\alpha K',$$

$$M'=M-\alpha K', \text{ and}$$

$$Y'=Y-\alpha K'.$$

The spatial filter process section 57 is provided for spatially filtering the image data of the CMYK signals received from the black generation and under color removal section 56 with a digital filter using the segmentation class signal thus to compensate the spatial frequency characteristic for eliminating burrs and granular faults in the output image.

For example, when the region separated by characters in the segmentation process section 53 is sharpened and emphasized by the spatial filter process of the spatial filter process section 57, its high frequency range is enhanced to enhance the reproducibility of chromatic text and achromatic text. At the same time, the processing of the tone reproduction processing section 59 is selectively set with binarization or multi-level dithering process for the screen at higher resolution suited for reproduction of the high frequency range. Also, the region separated by halftone in the segmentation process section 53 is subjected to a low-pass filtering processing for removing the input dot components. Finally, the output tone correction process of the output tone correction section 58 for converting the density signal into a halftone area rate which is one of the characteristics of the image output apparatus 7 is followed by the tone reproducing process of the tone reproduction process section 59 for reproducing the tone of the pixels separated from the image data. Meanwhile, the region separated by photograph in the segmentation process section 53 is subjected to the binarizing processing or the multi-level dithering processing for a screen specified in the tone reproduction.

The image data subjected to the foregoing processings is temporarily stored in a memory means (not shown) and read out at desired timing before transferred to the image output apparatus 7. The foregoing processings can be controlled by a CPU not shown.

The image forming apparatus may be equipped with a communication device. The communication device is selected from modems, network cards, and others. The communication device executes data communications via a network card or a LAN cable with any other apparatus (for example, a personal computer, a server, or another digital multi function printer) connected to a network.

For transmitting the image data, the communication device starts a processing of connecting with a target receiver prior to the transmission and, when the connection is established, reads out the image data (scanned with the scanner) of a properly compressed form from the memory. The image data is then subjected to a desired processing such as shifting the compression mode to another and transmitted to the receiver over a communication network.

For receiving the image data, the communication device starts a processing of connecting with a target transmitter and then receives the image data which is transferred to the image processing apparatus 5. The image data received by the image processing apparatus 5 is then subjected to the processings including expansion, rotation, resolution modification, output correction section, and tone reproduction before dispatched from the image output apparatus 7. The received image data may be stored in a storage (not shown) and, when needed, read out before subjected to the processing of the image processing apparatus 5.

It will be understood that while this embodiment is described in the form of a color multi-function printer, it may be a mono-color multi-function printer.

Embodiment 7

This embodiment will be described where the image processing apparatus is a facsimile machine.

Figure 31:
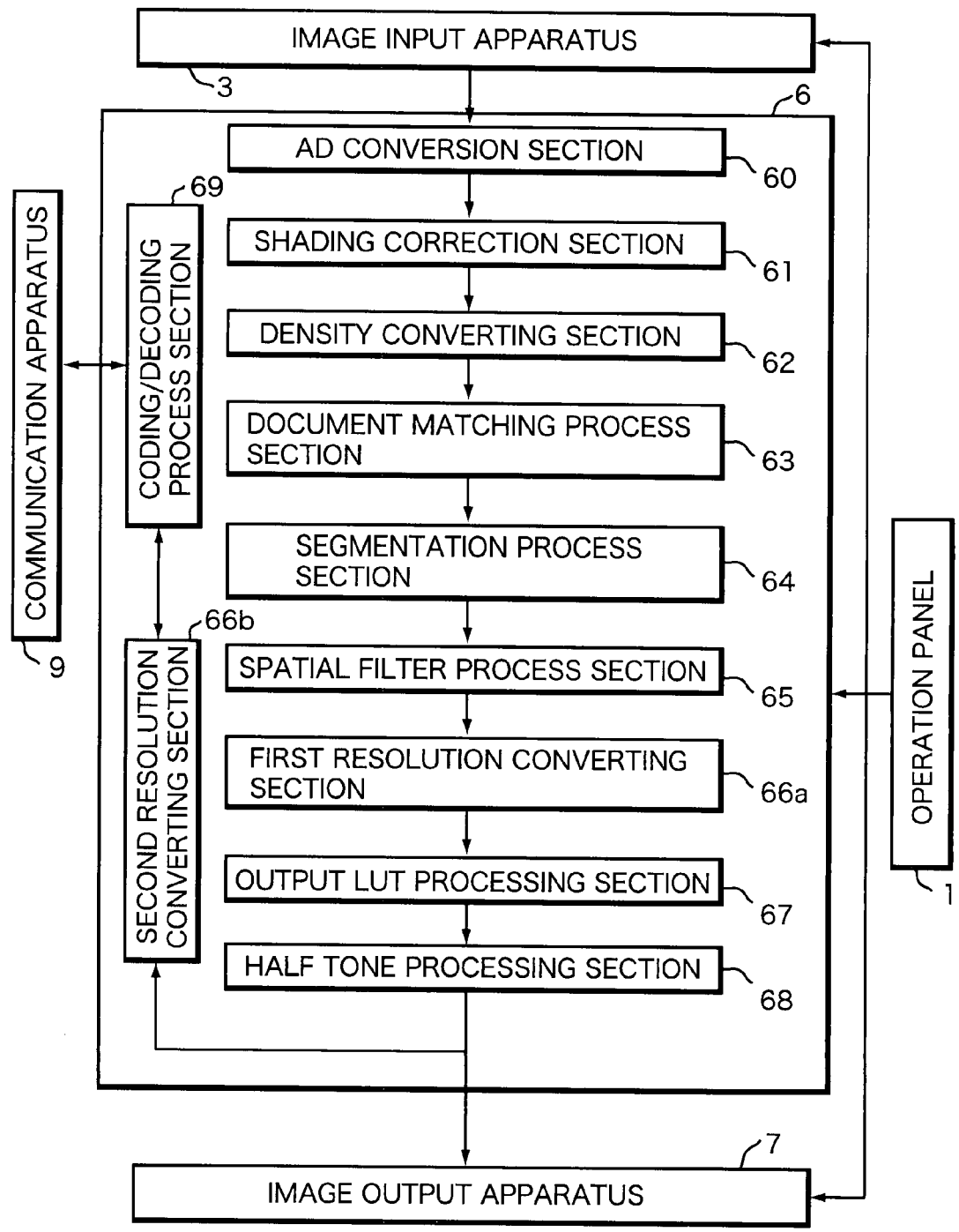
FIG. 31 is a block diagram of an internal arrangement of the facsimile machine showing one embodiment of the present invention.

FIG. 31 is a block diagram illustrating an internal arrangement of the facsimile machine of this embodiment. The facsimile machine of this embodiment includes an operation panel 1, an image input apparatus 3, and an image output apparatus 7 which are described with Embodiment 4 and in addition, an image processing apparatus 6 and a communication apparatus 9.

The image processing apparatus 6 includes an AD converting section 60, a shading correction section 61, a density converting section 62, a document matching process section 63, a segmentation process section 64, a spatial filter process section 65, a first resolution modifying section 66a, a second resolution modifying section 66b, an output LUT processing section 67, an half tone processing section 68, and a coding/decoding processing section 69.

The AD converting section 60 is provided for converting an analog RGB signal received from the image input apparatus 3 into a digital signal. The shading correction section 61 is provided for removing various faults, which have been developed in the illumination system, the focusing system, and the imaging system, from the digital RGB signal received from the AD converting section 60. The density converting section 62 is provided for converting the image data subjected to the shading correction into a density data by correcting the non-linearity of gray levels. This processing is carried out using an LUT (look up table).

The document matching process section 63 is provided for executing the feature point calculating processing described with Embodiment 1 and examining the similarity with the text image data registered in advance from the result of the feature point calculating processing. When judging that the document is similar as assigned with the description of the processing, the document matching process section 63 displays the description of the processing on a display in the display panel 1 for permitting the user to enter a command and carries out the processing upon receiving the command.

The segmentation process section 64 is provided for separating the pixels in the input image received from the density converting section 62 into character regions, halftone regions, or photograph (or other) regions. The segmentation process section 64 produces from the result of the separation processing a segmentation class signal which indicates the region to which the pixels are assigned before delivering the signal to the spatial filter process section 65 and the half tone processing section 68 while transfers the input signal received from the density converting section 62 directly to the spatial filter process section 65 at the succeeding stage.

The spatial filter process section 65 is provided for spatially filtering the image data received from the segmentation process section 64 with a digital filter using the segmentation class signal thus to compensate the spatial frequency characteristic for eliminating burrs and granular faults in the output image.

The first resolution modifying section 66*a* is provided for modifying the resolution from its rate at the input image received from the image input apparatus 3 to a rate or the image output apparatus 7. This processing may be executed by a first-degree interpolation technique. When the facsimile processing is involved, the processing of the first resolution modifying section 66*a* is omitted.

The output LUT processing section 67 is provided for subjecting the image data modified in the resolution to a gray-level compensating processing through reviewing the LUT table, depending on the toner property (in the electronic photographic mode) or the ink property (in the ink-jet printing mode). This processing involves correcting the non-linearity of gray levels for the image output apparatus 7.

The half tone processing section 68 is provided for converting the 8-bit level of each pixel in the image data received from the output LUT processing section 67 into a binary value, for example, by an error diffusion technique. This processing is based on the segmentation class signal produced by the segmentation process section 64. For example, the character regions determined by the segmentation process section 64 are binarized for ease of the reproduction of the high frequency range while the photograph regions determined by the segmentation process section 64 are binarized for ease of the reproduction of gray levels.

For the facsimile transmission, the image data binarized by the half tone processing section 68 is transferred to the second resolution modifying section 66*b*. The second resolution modifying section 66*b* executes a processing of modifying the resolution as desired. The second resolution modifying section 66*b* may be connected at its downstream side with an image rotation processing section for rotating the image. The compression/expansion processing section 69 is provided for compressing the image data of a binarized form or the image data modified in the resolution to a desired size before saving the data in an unshown memory.

The communication apparatus 9 is, for example, a modem for connecting with a target to be communicated. When establishing the connection with the target, the communication apparatus 9 reads the image data of a compressed form from the unshown memory and subjects the same to the processings before transmitting over a network to the target.

For the facsimile reception, the communication apparatus 9 receives image data of the compressed form from the transmitter. The received image data is then transferred to the image processing apparatus 6. The image data received by the image processing apparatus 6 is expanded by the processing of the compression/expansion processing section 69 so that its resultant image received as a page image is reproduced.

The reproduced document image is subjected to the rotating processing and the resolution modifying processing of the second resolution modifying section 66*b* in accordance with the output capability of the image output apparatus 7. The image data reproduced as a section page is finally released from the image output apparatus 7.

Described above is the processings of the monochromatic image data as an example. Alternatively, this embodiment can be implemented in the form of a color image processing apparatus which has a color correction section and a black generation and under color removal section connected between the segmentation process section 64 and the spatial filter process section 65, the color correction section arranged for removing color impurity, which are derived from the spectral characteristics of the CMY components of toner or ink as including useless absorption components, from the RGM signal received from the image input apparatus 3 for ensuring the fidelity of color reproduction and the black generation and under color removal section arranged for executing a black generating processing for generating the black (K) signal from the three, CMY, color signals subjected to the color correction process and subtracting the K signal from the original CMY signals to produce new CMY signals.

Embodiment 8

The image processing including the document matching process and the output control described above is capable of being stored in a recording medium which is operable with a computer containing a program code (including an execution format program, an intermediate coding program, and a source program) for controlling the computer. This embodiment will be described in the form of a system for performing the image processing method described above through executing the program code read out from the recording medium.

Figure 32:
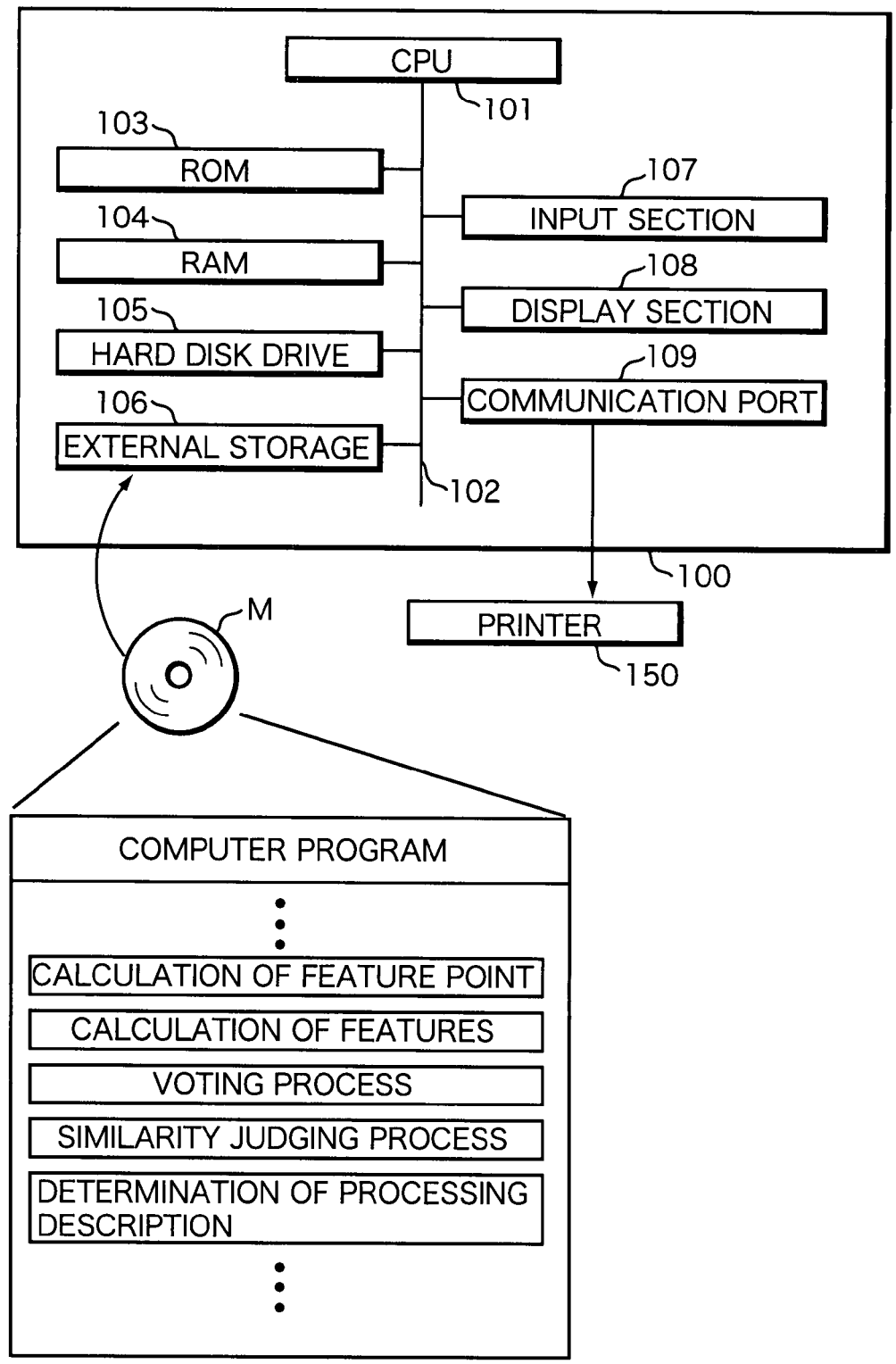
FIG. 32 is a block diagram showing an internal arrangement of the image processing apparatus for reading and operating a program code stored in a recording medium.

FIG. 32 is a block diagram showing an internal arrangement of the image processing apparatus which carries out the program code read from the recording medium. Denoted by 100 in the figure is the image processing apparatus which is namely a personal computer or a work station. The image processing apparatus 100 includes a CPU 101 which is connected by a bus 102 to a ROM 103, a RAM 104, a hard disk drive 105, an external storage 106, an input section 107, a display section 108, and a communication port 109. The CPU 101 controls the processing of each hardware according to the control program stored preliminarily in the ROM 103.

The RAM 104 is a volatile memory where the control program and various data produced by the processing of the program code are temporarily stored. The hard disk drive 105 is a memory means equipped with magnetic recording mediums where the program code received from a recording medium M is stored. The external storage 106 includes a reader for reading the program code from the recording medium M for driving the computer to execute the processing. The recording medium M may be an FD (flexible disk) or a CD-ROM. The program code read by the external storage 106 is stored in the hard disk drive 105. The CPU 101 loads the program code read from the hard disk drive 105 onto the RAM 104 for executing the program code. More particularly, the entire apparatus is functioned for carrying out the examining processing described with Embodiment 1, whereby the image data from a document when found similar to one of the registered images is subjected to the processings assigned to the registered image.

The input section 107 serves as in interface for receiving the image data from the outside. The input section 107 is connected to, for example, a color scanner. The display section 108 functions as an interface for displaying the image data to be processed, the image data during the processing, and the image data after the processing. The display section 108 may be connected with an external display device such as a liquid crystal display for displaying the image data or may include such a display device for displaying the image data. The communication port 109 is an interface for connection with an external printer 150. For printing the image data subjected to the processing with the printer 150, the image processing apparatus 100 produces a print dada to be decoded by the printer 150 before transferring to the printer 150.

Although the CPU 101 is arranged for executing the arithmetic operations in this embodiment, it may be replaced by a dedicated chip device of which the arithmetic operation is controlled by the CPU 101.

The recording medium M for storing the program code is not limited to the FD or the CD-ROM but may be selected from an optical disk such as an MO disk, an MD disk, and a DVD disk, a magnetic recording medium such as a hard disk drive, a card type recording medium such as an IC card, a memory card, and an optical card, and a semiconductor memory device such as a mask ROM, an EPROM (Erasable Programmable Read Only Memory), an EEPROM (Electrically Erasable Programmable Read Only Memory), or a flash ROM. As the system is capable of connecting to communication networks including the Internet, it may download the program code from any of the communication networks. For enabling the downloading of the program code from such a communication network, a program for executing the downloading may be stored in advance in the apparatus or alternatively installed from another applicable recording medium.

The computer program may be in the form of a single application program, a utility program, or a part of the combination of another application program and a utility program. For example, the computer program is installed in a printer driver for ease of the use.

Embodiment 9

Figure 33:
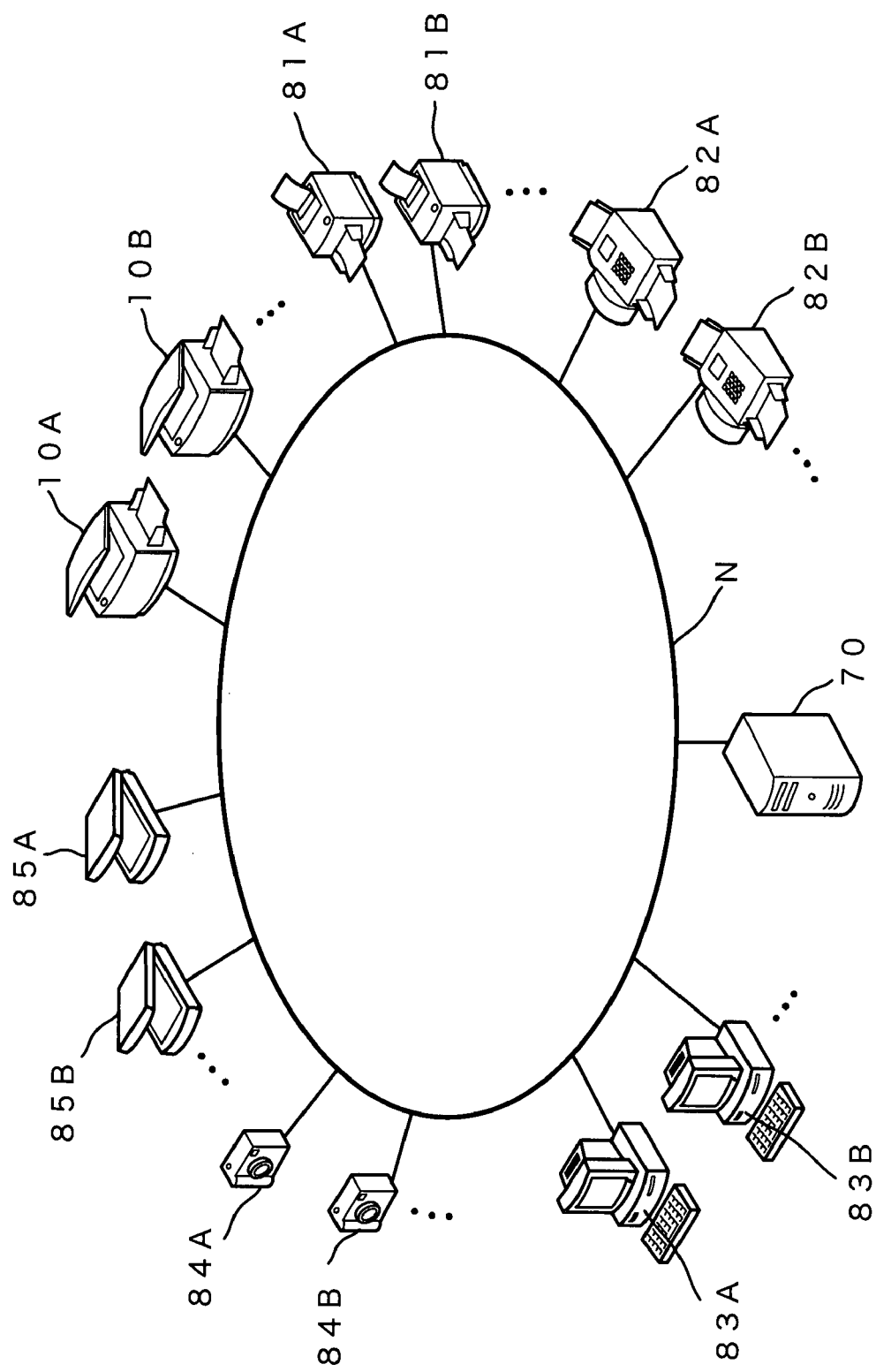
FIG. 33 is a schematic view of an overall arrangement of the image processing system showing one embodiment of the present invention.

FIG. 33 is a schematic view of the entire arrangement of an image processing system illustrating one embodiment of the present invention. As shown in FIG. 33, the image processing system of this embodiment includes a server 70, a group of multi function printer (MFPs) 10A, 10B . . . , a group of printers 81A, 81B . . . , a group of facsimile machines 82A, 82B . . . , and group of scanners 85A, 85B . . . which all are connected over a network N.

The server 70 is arranged for exclusively controlling a processing description decision table 73a and a hash table 73b (See FIG. 34) and allowing the MFP 10A(10B) connected over the network N to download the processing description decision table 73a and the hash table 73b. The downloading of the processing description decision table 73a and the hash table 73b may be started when the MFP 10A(10B) has been turned on and a control section 11 has confirmed the execution of the communication line. When the MFP 10A(10B) remains normally turned on, the tables 73a, 73b can be replaced at any proper timing with another pair where their contents have been updated.

Figure 34:
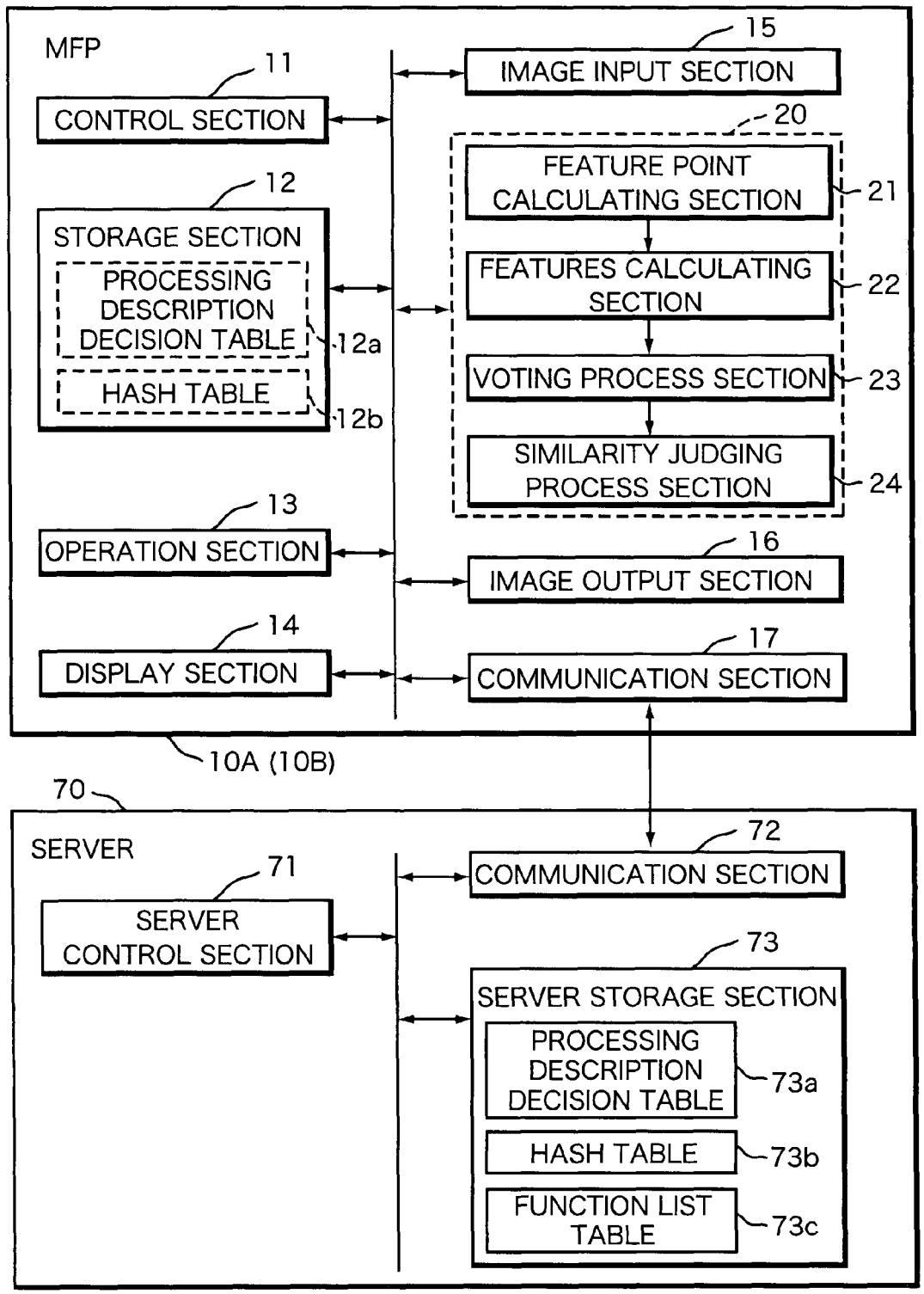
FIG. 34 is a block diagram showing the internal arrangements of an MFP and a server in Embodiment 9 of the present invention.

FIG. 34 is a block diagram showing internal arrangements of the MFP 10A(10B) and the server 70 in Embodiment 9. The MFP 10A(10B) includes the control section 11, a storage section 12 (second storage section), an operation section 13, a display section 14, an image input section 15, an image output section 16, a communication section 17, and a document matching process section 20. This internal arrangement is substantially equal to that of the image processing apparatus of Embodiment 1, where like components are denoted by like numerals as those shown in FIG. 1.

The server 70 includes a server control section 71, a communication section 72, and a server storage section 73. While a variety of descriptions of the processing assigned to each of the registered images are stored in the processing description decision table 73a, some MFPs may have no function for executing the stored processings. For compensation, a list table showing the relationship between each MFP and its operable processings may be provided (See a function list table 73c schematically shown in FIG. 35). When the processing description decision table 73a is downloaded, each function (a processing) not operable in the MFP is accompanied with a invalidation flag showing the disabling of the function. This can be executed by the server control section 71.

The functions of the MFP are called and stored in the server 70 upon the MFP being connected with the network N and further registered in the function list table 73c by the manager of the server 70. When the MFP is replaced with another MFP, its functions are compared with those of the another MFP to update the function list table 73c. In a case where any new function is additionally provided, it should be registered for the future use. If one of the existing functions is removed, its absence has to be registered. When the function is removed, its absence may be displayed on a display of the MFP.

Figure 36:
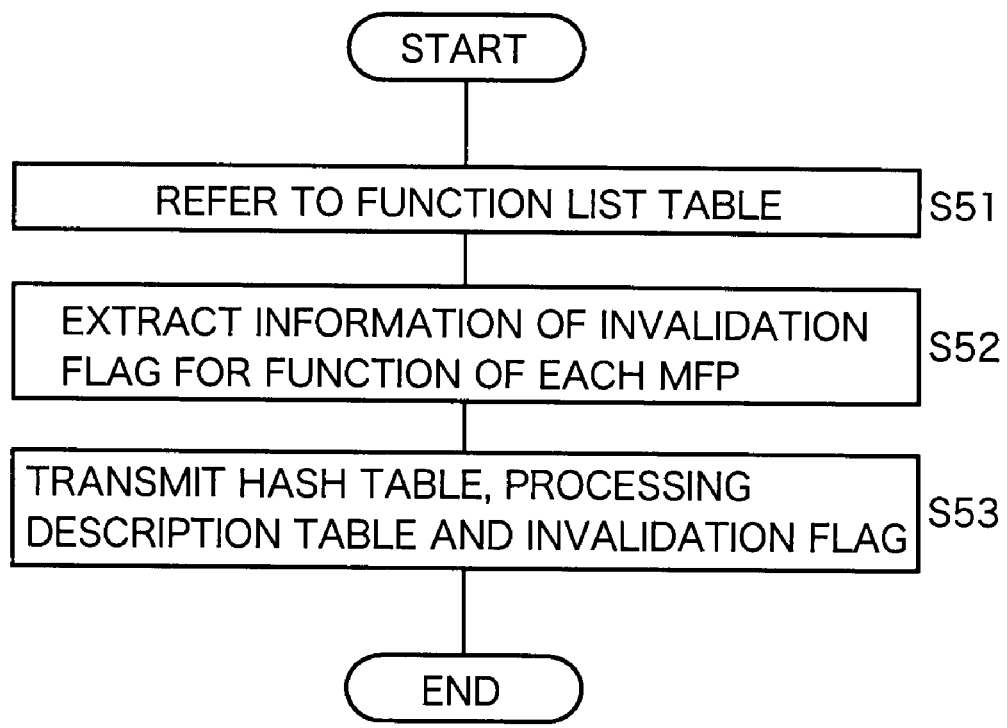
FIG. 36 is a flowchart illustrating a procedure of the processing to be executed by the server.

FIG. 36 is a flowchart showing a procedure of the processings to be executed by the server 70. When the receipt of the processing description decision table 73a and the hash table 73b is requested by one MFP, the server 70 refers to the function list table 73c (Step S51), extracts information of the invalidation flags for functions of each of MFPs (Step S52), and transmits the information of the invalidation flags together with the processing description decision table 73a and the hash table 73b to the MFP which made a demand (Step S53).

Figure 37:
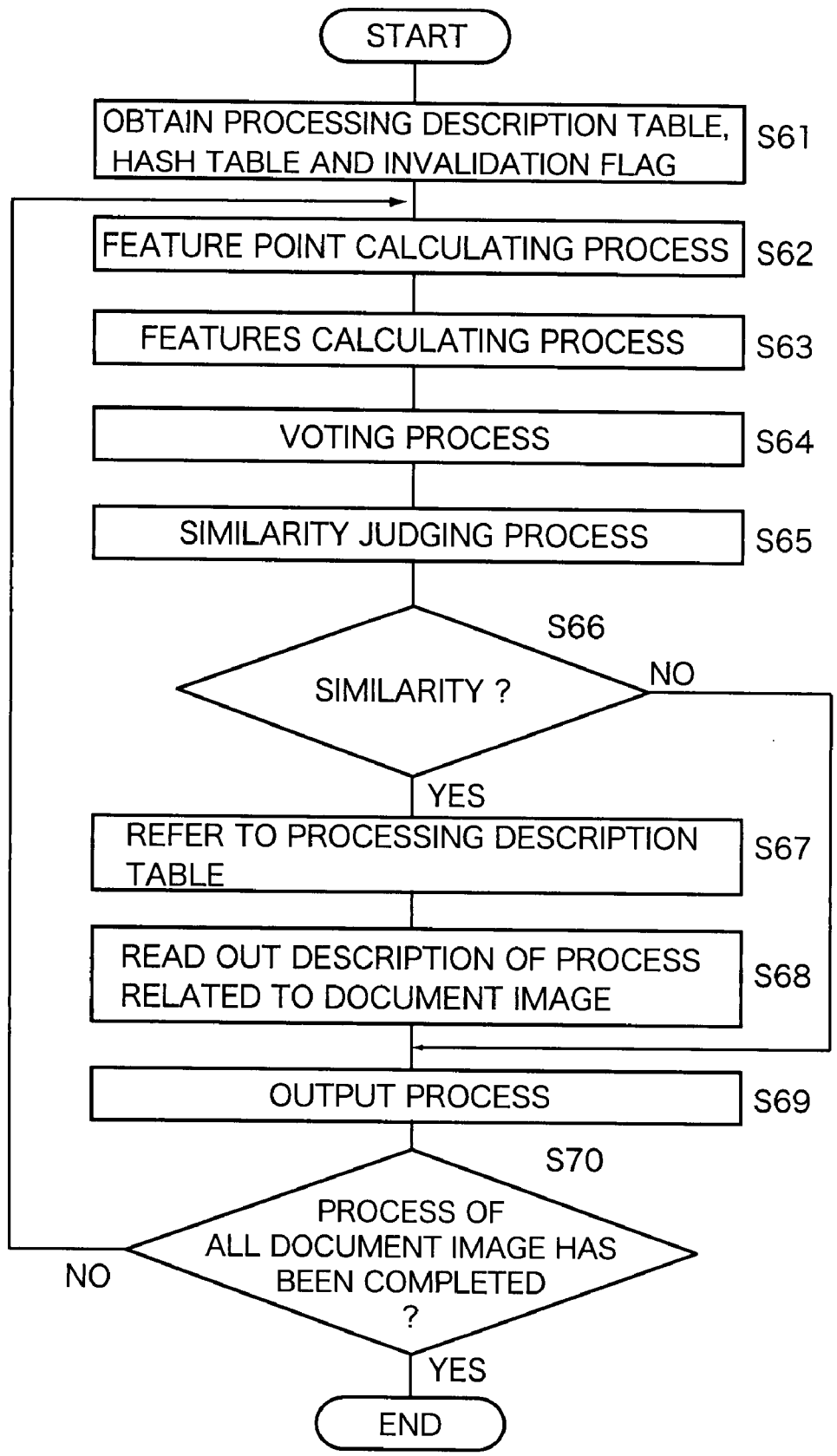
FIG. 37 is a flowchart illustrating a procedure of the processing to be executed by the MFP.

FIG. 37 is a flowchart showing a procedure of the processings to be executed by the MFP 10A. The MFP 10A provides the server 70 with a demand for the receipt and obtains (downloads) the processing description decision table 73a, the hash table 73b, and the information of the invalidation flags (Step S61). More specifically, the tables and information are downloaded at the timing of turning the MFP 10A on or updating the contents of the tables 73a, 73b in the server 70. The tables downloaded are stored in the storage section 12 in the MFP 10A (i.e., the tables are stored as the processing description decision table 12a and the hash table 12b).

Then, similar to the processings of Embodiment 1, the image data received from the image input section 15 is subjected to the feature point calculating processing (Step S62). The feature point is determined from the centroid in a connected component in the image data. The feature points are then transferred to the features calculating section 22.

The features calculating section 22 calculates the features from the feature point received from the feature point calculating section 21 (Step S63). The features are determined as a hash value based on the distance between the feature points. The features thus determined are transferred to the voting processing section 23.

The voting processing section 23 accesses the hash table 12*b* according to the features (hash value) received from the features calculating section 22 to execute a voting processing for voting the index of a registered document (Step S64). In response to the result of the voting received from the voting processing section 23, the similarity judgment processor 24 examines for the similarity (Step S65). The similarity judging processing may be the description described in more detail with Embodiment 1.

When receiving the result of judgment from the similarity judgment processor 24, the control section 11 in the MFP 10A examines whether or not the document image of interest is similar to a stored image (a registered image) which is stored in the storage section 12 (Step S66). When judging that the document image is similar to one of the registered images (YES in S66), the control section 11 examines the processing description decision table 12*a* stored in the storage section 12 (Step S67) and reads out the description of the process related to the document image (Step S68). The processing for output is then executed according to the description read out (Step S69). Each description of the processing stored in the MFP 10A is preset to be disabled when its invalidation flag is received from the server 70.

When it is judged that the document image is similar to none of the registered images (NO in S66), the processing for output is carried out according to the instruction received from the operation section 13 of the MFP 10A (Step S69).

The control section 11 then examines whether the processing of all the document image has been completed or not (Step S70). When it is judged that the processing has not been completed (NO in S70), the procedure returns back to Step S62. When it is judged that the processing has been completed (YES in S70), the procedure of the flowchart is terminated.

The processing description decision table 73 and the hash table 73*b* may be arranged to be downloaded by any of the printers 81A, 81B . . . , the facsimile machines 82A, 82B . . . , and the scanners 85A, 85B . . . in addition to the MFPs 10A, 10B, and so on. In this case, the function list table 73*c* may be added with function lists of the printers 81A, 81B . . . , the facsimile machines 82A, 82B . . . , and the scanners 85A, 85B, and so on.

Embodiment 10

As different from Embodiment 9 where the processing description decision table 73*a* and the hash table 73*b* stored in the server 70 are downloaded to the MFP 10A(10B) which makes the decision of the description of the processing from the result of the similarity judgment over the document image, this embodiment is arranged where the server 70 carrying the processing description decision table 73*a* and the hash table 73*b*, upon receiving the features from any of the MFPs 10, 10B, the printer 81A, 81B, and the others, executes the similarity judgment and, when judging that the document image is similar to one of the registered images, examines the processing description decision table 73*a* and the function list table 73*c* in order to selectively pick up and dispatch the description of the processing (including the invalidation flags when the disabled processings are found).

Figure 38:
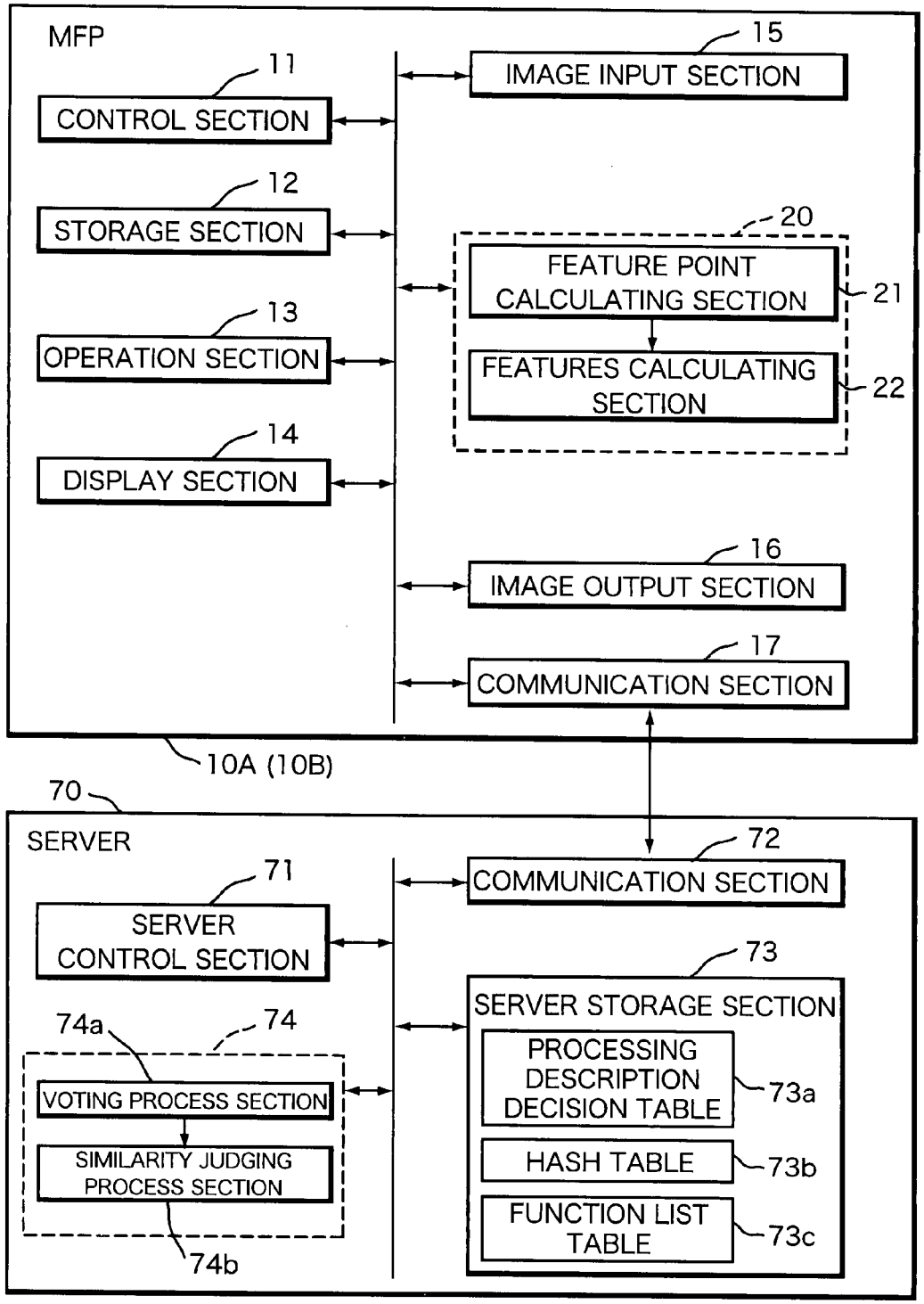
FIG. 38 is a block diagram showing the internal arrangements of an MFP and a server in Embodiment 10 of the present invention.

FIG. 38 is a block diagram showing internal arrangements of the MFP 10A(10B) and the server 70 in Embodiment 10. The hardware arrangement of the MFP 10A(10B) is equal to that shown in Embodiment 9, except that the document matching process section 20 includes none of the voting processing section 23 and the similarity judgment processor 24 because the processing of calculating the features is executed by the MFP 10A(10B).

The server 70 includes a server control section 71, a communication section 72, a server storage section 73, and a document matching process section 74 which includes a voting processing section 74*a* and a similarity judgment processor 74*b*. the description data stored in the voting processing section 74*a* and the similarity judgment processor 74*b* are equal to those stored in the voting processing section 23 and the similarity judgment processor 24 described with Embodiment 1 and will be explained in no more detail.

Figure 39:
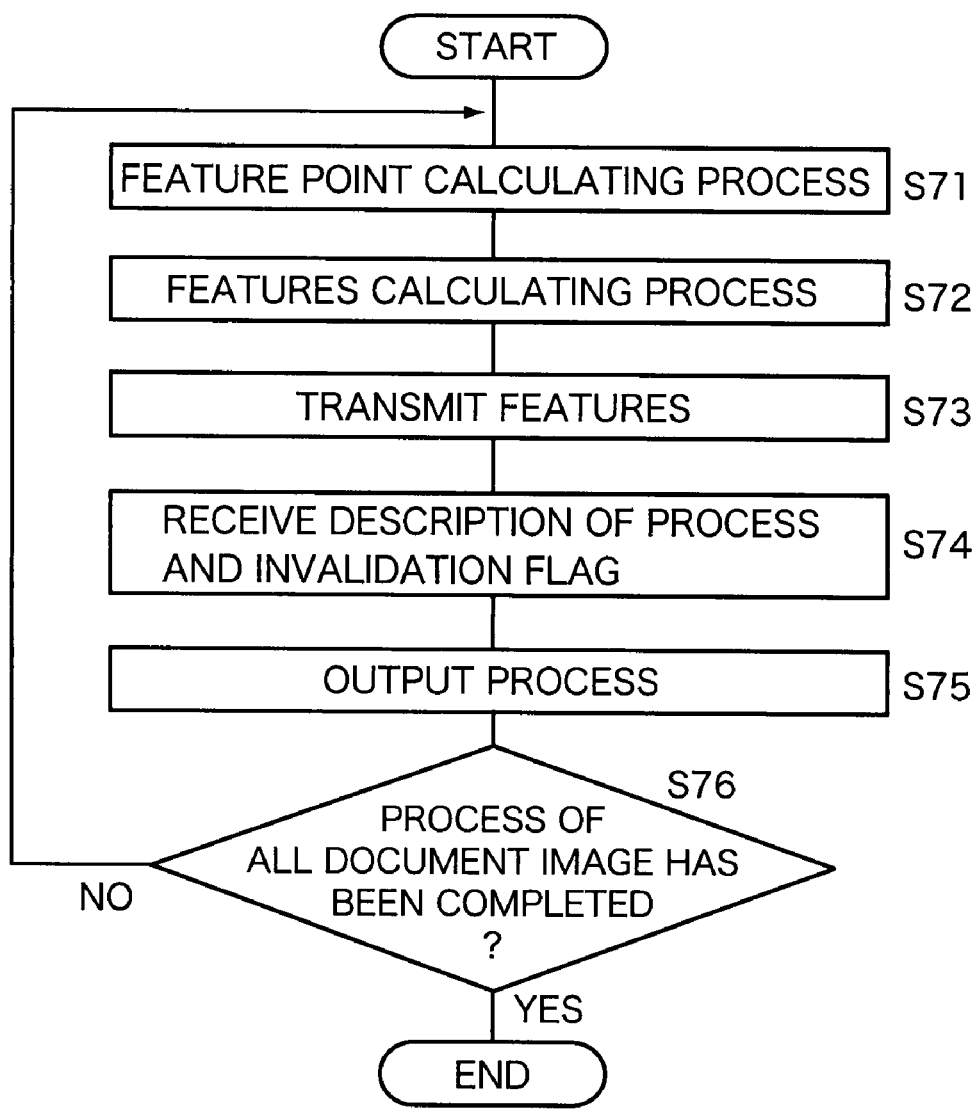
FIG. 39 is a flowchart illustrating a procedure of the processing to be executed by the MFP.
Figure 40:
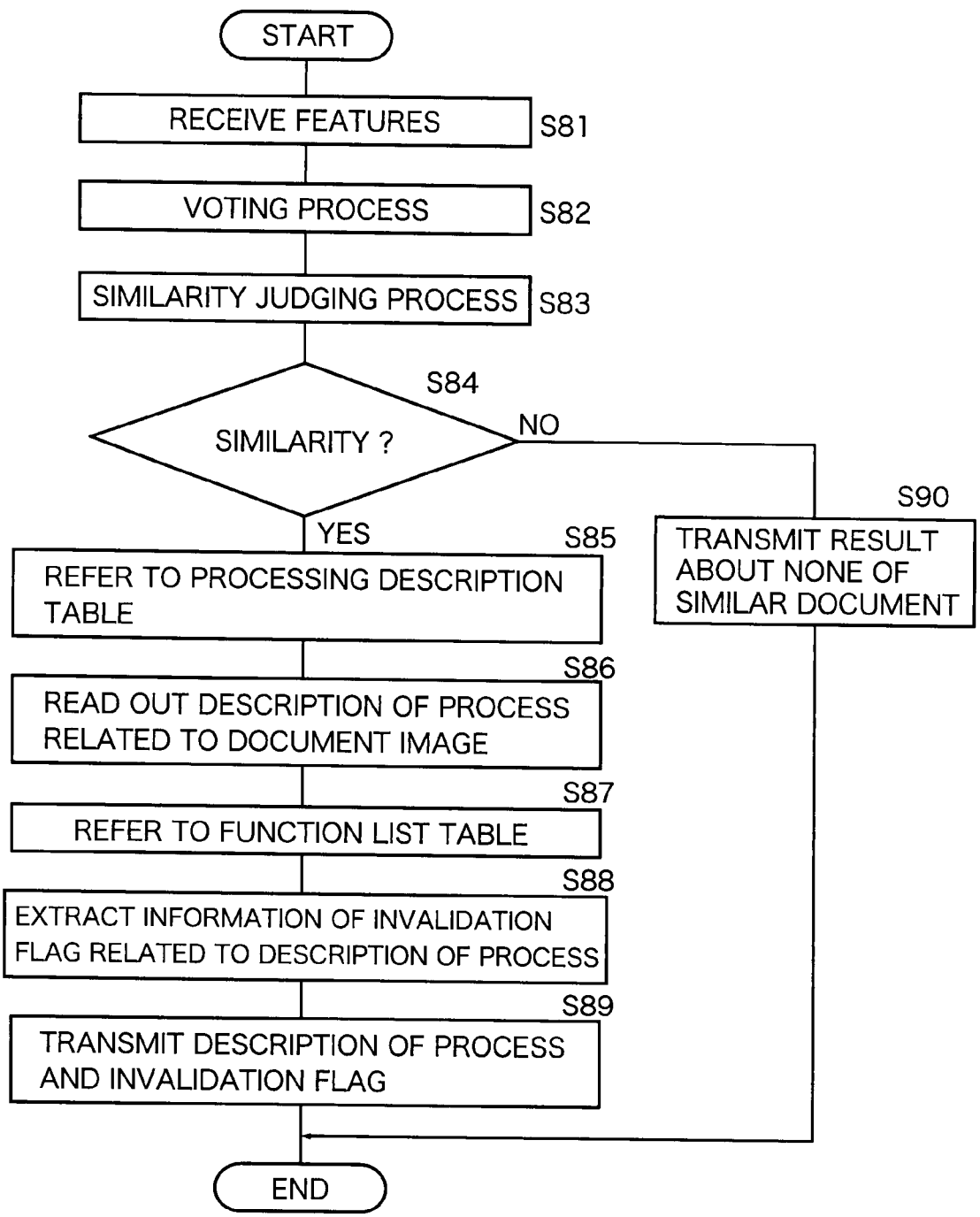
FIG. 40 is a flowchart illustrating a procedure of the processing to be executed by the server.

FIG. 39 is a flowchart showing a procedure of the processings to be executed by the MFP 10A while FIG. 40 is a flowchart showing a procedure of the processings to be executed by the server 70. The MFP 10A starts with calculating the feature points from the image data received from the image input section 15, similar to that of Embodiment 1 (Step S71). The feature point is determined from the centroid in a connected component in the image data. The feature points are then transferred to the features calculating section 22.

The features calculating section 22 calculates the features from the feature point received from the feature point calculating section 21 (Step S72). The features are determined as a hash value based on the distance between the feature points. The features determined by the MFP 10A is then transferred to the server 70 (Step S73).

When the server 70 receives the features from the MFP 10A (Step S81), its voting processing section 74*a* accesses the hash table 73*b* stored in the server storage section 73 according to the received features (hash value) to execute a voting processing for voting the index of a registered document (Step S82). In response to the result of the voting received from the voting processing section 74*a*, the similarity judgment processor 74*b* executes the similarity judgment (Step S83).

In response to the result of the judgment made by the similarity judgment processor 74*b*, the server control section 71 in the server 70 examines whether or not the document image of interest is similar to a stored image (a registered image) which is stored in the storage section 73 (Step S84). When judging that the document image is similar to one of the registered images (YES in S84), the server control section 71 accesses the processing description decision table 73*a* stored in the server storage section 73 (Step S85) and reads out the description of the processing assigned to the document image (Step S86).

Also, the server control section 71 refers to the function list table 73*c* stored in the server storage section 73 (Step S87) and extracts the invalidation flags related to the description of process (Step S88).

The description of the process determined in Step S86 and the invalidation flags extracted in Step S88 are transmitted to the MFP 10A (Step S89). When it is judged that the document image is similar to none of the registered images (NO in S84), its judgment result is transmitted to the MFP 10A (Step S90).

When receiving the description of the processing determined and the invalidation flags (Step S74), the MFP 10A executes the processing according to those data (Step S75).

Then, the control section 11 in the MFP 10A examines whether the processing of the images of all the documents has been completed or not (Step S76). When it is judged that the processing has not been completed (NO in S76), the procedure returns back to Step S71. When it is judged that the processing has been completed (YES in S76), the procedure of the flowchart is terminated.

Alternatively, the processing of examining whether the processing is disabled or not may be executed by the MFP 10A(10B) comparing its own function with the description of the processing downloaded with no use of the function list table 73c since only the description of the processing assigned to the document image is to be downloaded in this embodiment. When the server 70 carries no registration of the similar image data, the MFP 10A(10B) upon being notified of the no registration executes the processing in response to the instruction entered from its operation panel.

Embodiment 11

A further embodiment of the present invention is provided in which while the processing description decision table 73a and the hash table 73b are stored in the server 70, the hard table 73b only can be downloaded to any of the MFPs 10A, 10B . . . , the printer 81A, 81B . . . , and so on. In this embodiment, when one of the MFPs 10A, 10B . . . , the printers 81A, 81eB . . . , and so on judges that the document image is similar to one of the registered images, it accesses the server 70 for examining and acquiring the description of the processing.

Figure 41:
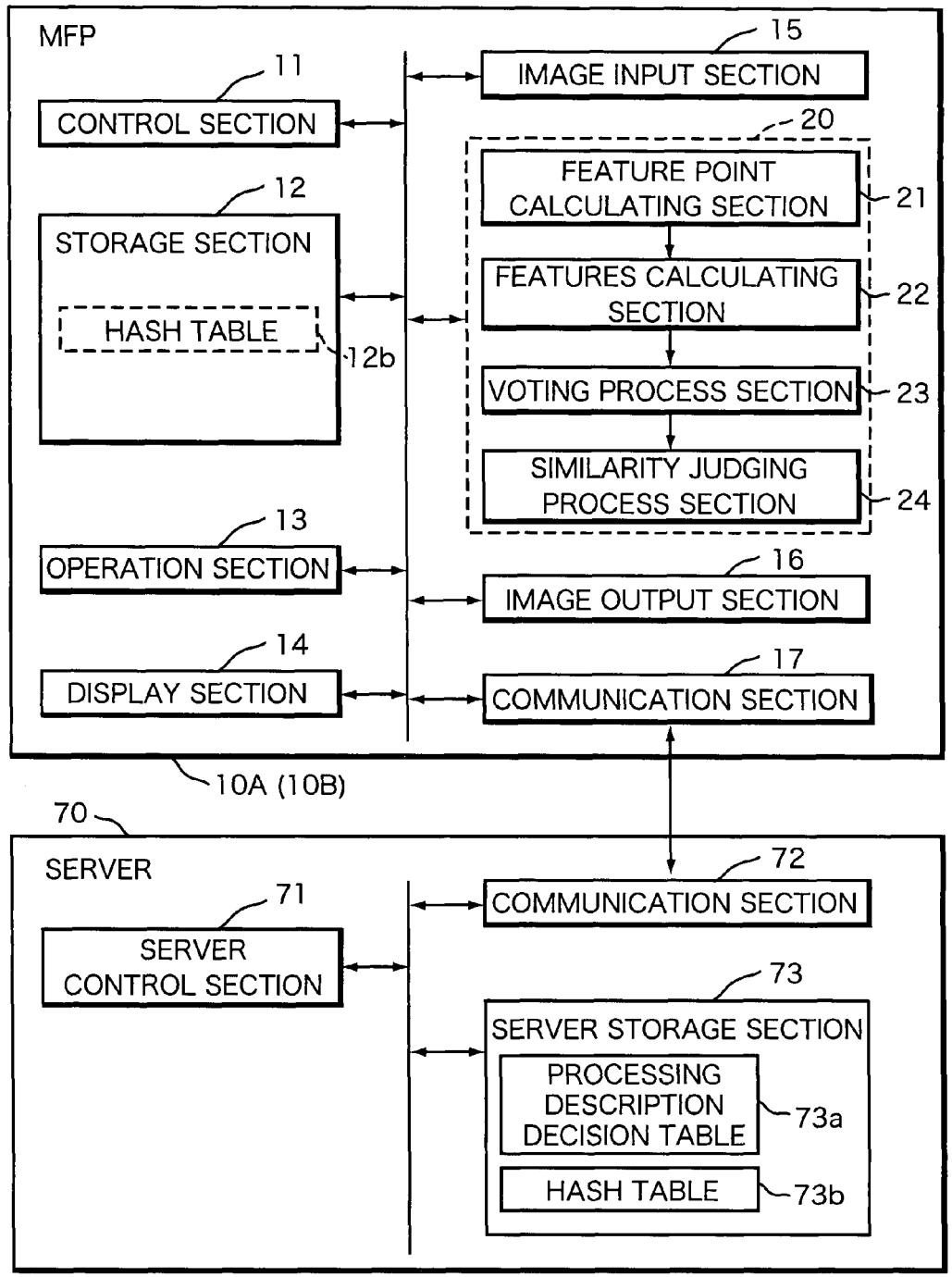
FIG. 41 is a block diagram showing the internal arrangements of an MFP and a server in Embodiment 11 of the present invention.

FIG. 41 is a block diagram showing internal arrangements of the MFP 10A(10B) and the server 70 in Embodiment 11. The hardware arrangements are equal to those in Embodiment 9, except that the MFP 10A in this embodiment is arranged to download only the hash table 73b from the server 70 and store the same in its storage section (the hash table stored in the storage section 12 being denoted by 12b).

Figure 42:
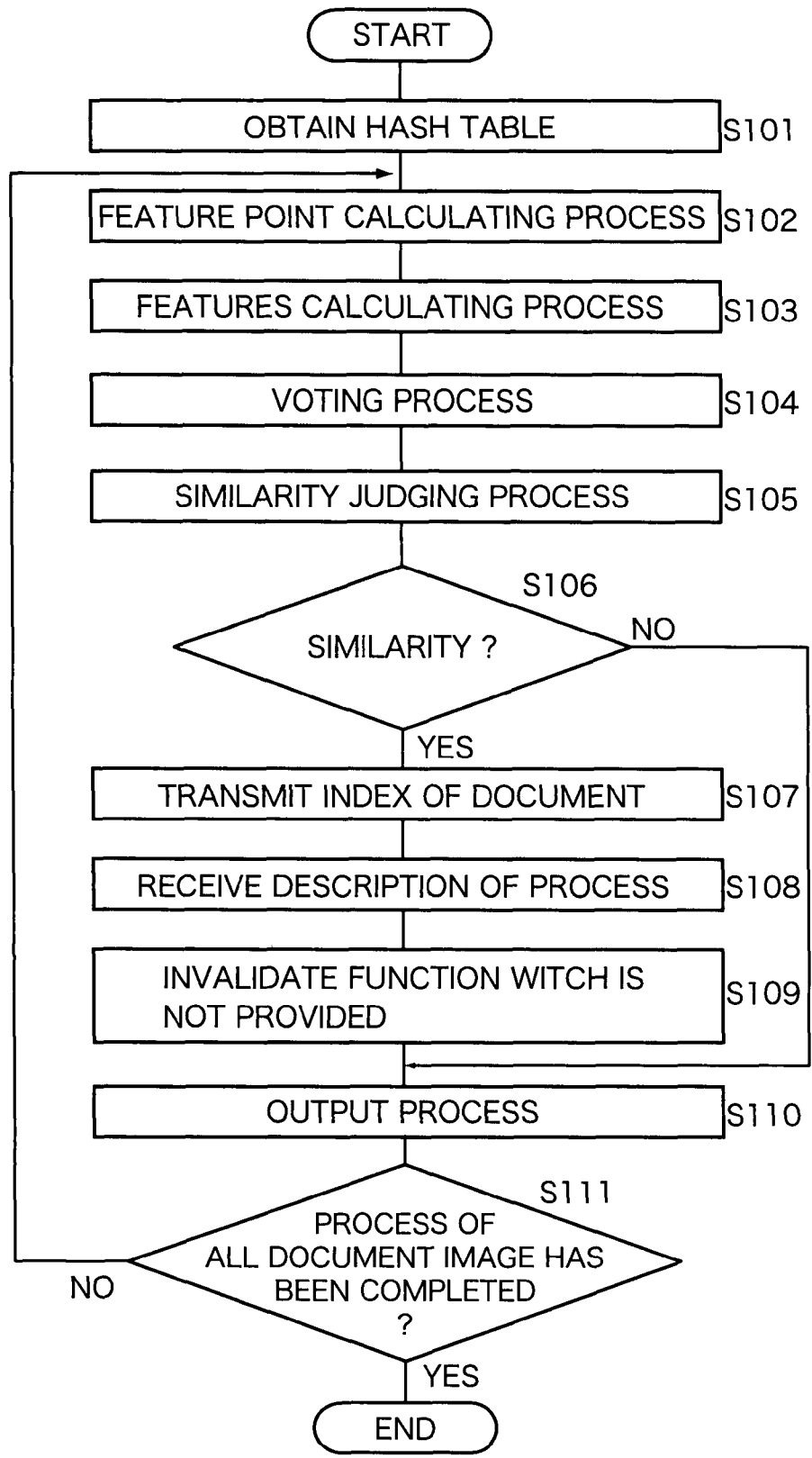
FIG. 42 is a flowchart illustrating a procedure of the processing to be executed by the MFP.
Figure 43:
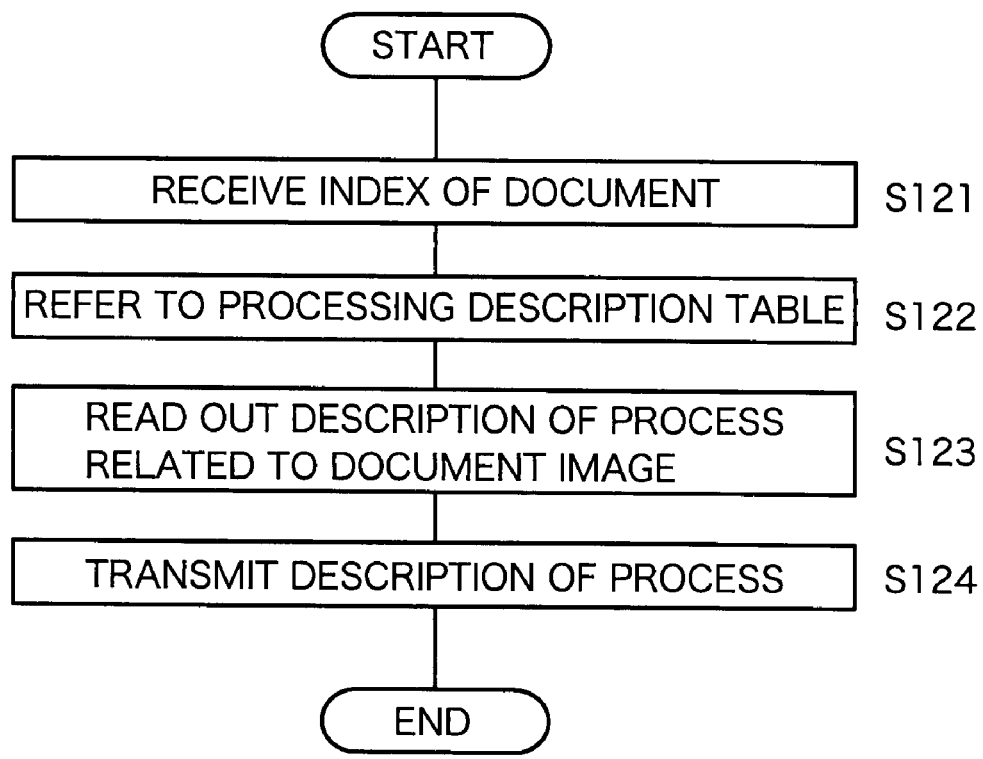
FIG. 43 is a flowchart illustrating a procedure of the processing to be executed by the server.

FIG. 42 is a flowchart showing a procedure of the processings to be executed by the MFP 10A while FIG. 43 is a flowchart showing a procedure of the processings to be executed by the server 70. The MFP 10A starts with supplying the server 70 with a demand of transmission and receiving (downloading) the hash table 73b from the server 70 (Step S101). The hash table 73b is then stored in the storage section 12.

As similar to that of Embodiment 1, the MFP 10A calculates the feature points from the image data received from the image input section 15 (Step S102). The feature point is determined from the centroid in a connected component in the image data. The feature points are then transferred to the features calculating section 22.

The features calculating section 22 calculates the features from the feature point received from the feature point calculating section 21 (Step S103). The features are determined as a hash value based on the distance between the feature points. The features thus determined are then transferred to the voting processing section 23.

The voting processing section 23 accesses the hash table 12b stored in the storage section 12 according to the received features (hash value) determined by the features calculating section 22 in order to execute a voting processing for voting the index of a registered document (Step S104). In response to the result of the voting received from the voting processing section 23, the similarity judgment processor 24 executes the similarity judgment (Step S105). The similarity judgment can be executed by the same description as described with Embodiment 1.

In response to the result of the judgment made by the similarity judgment processor 24, the control section 11 in the MFP 10A examines whether or not the document image of interest is similar to a stored image (a registered image) which is stored in the storage section 12 (Step S106). When judging that the document image is similar to one of the registered images (YES in S106), the control section 11 transmits the index indicating the document to the server 70 (Step S107).

When receiving the index indicating the document from the MFP 10A (Step S121), the server 70 accesses the processing description decision table 73a (Step S122) and reads out the description of the processing from the table (Step S123). The description of the processing read by the server 70 is transmitted to the MFP 10A (Step S124).

When receiving the description of the processing from the server 70 (Step S108), the MFP 10A compares its own functions with the description of the processing to invalidates function which is not provided (Step S109). The MFP 10A carries out the processing according to the description received (Step S110). When judging that the document image is similar to none of the registered images (NO in S106), the MFP 10A(10B) carried out the processing according to the instruction received from its operation panel (Step S110).

Then, the control section 11 in the MFP 10A examines whether or not the processing of all the document images has been completed (Step S111). When it is judged that the processing has not been completed (NO in S111), the procedure returns back to Step S102. When it is judged that the processing has been completed (YES in S111), the procedure of the flowchart is terminated.

As this invention may be embodied in several forms without departing from the sprit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing apparatus comprising:
    an output processing section for executing an output process based on an image data obtained by reading a document image;
    a storage section in which a description of the output process to be executed by the output processing section is stored in relation with a stored image; and
    a controller capable of performing operations of:
        determining whether or not the document image is similar to the preliminary stored image based on the obtained image data;
        when determining that the image is similar to the stored image, reading out the description of the output process stored in relation with the stored image from said storage section; and
        controlling the output process to be executed by said output processing section in accordance with the read out description of the output process,
    the image processing apparatus further comprising:
    a features storage section for storing features of stored images;
    a features calculating section for calculating features of the document image based on the obtained image data; and
    a comparator section for comparing between the calculated features and the features of the stored images, wherein said controller is further capable of:
  determining whether or not the document image is similar to the stored image based on the comparison by the comparator section, and
the image processing apparatus further comprises:
  a region extracting section for extracting a plurality of regions composed of identical factors from said document image; and
  a centroid calculating section for calculating the centroid in each of the extracted regions, wherein
  the features of the document image are calculated based on the centroid.

2. The image processing apparatus according to claim 1, further comprising:
  a receiving section for receiving a modification of the description to be executed; and
  an updating section for storing the history of the modification of the description and, in response to the history, updating the description of the process to be stored in said storage section.

3. The image processing apparatus according to claim 1, wherein
  the description of the output process includes a process of inhibiting the output of the image related to the obtained image data or replacing the image related to the obtained image data with another image before outputting the image.

4. The image processing apparatus according to claim 3, wherein
  said controller is further capable of selecting, based on the mode of the output process, between the process of inhibiting the output of the image related to the obtained image data and the process of replacing the image related to the obtained image data with another image before outputting the image.

5. The image processing apparatus according to claim 1, wherein
  the description of the output process includes at least one of processes of modifying the resolution of the image related to the obtained image data, adjusting the gamma characteristic of the image related to the obtained image data, converting the color signal related to the obtained image data into an achromatic signal, and reproducing the half tone related to the obtained image data.

6. The image processing apparatus according to claim 5, wherein
  said controller is further capable of performing operations of:
    displaying the description of the output process and the image processed according to said description and requesting a user to confirm the description; and
    when the user rejects the description, modifying at least an item of said description rejected by the user before repeating said processing.

7. The image processing apparatus according to claim 5, wherein
  the description of the output process further includes at least one of processes of assigning the image related to the obtained image data with an electronic signature, assigning the image related to the obtained image data with a time stamp, encrypting the image related to obtained image data, and assigning the image related to the obtained image data with a result of character recognition on said image data.

8. The image processing apparatus according to claim 1, wherein
  the features are represented by an invariant parameter which remains unchanged regardless of a geometrical change of said document image such as rotation, parallel movement, or scaling.

9. The image processing apparatus according to claim 1, wherein
  the features are represented by an invariant parameter which remains unchanged regardless of a geometrical change of said document image such as rotation, parallel movement, or enlargement/reduction, and
  said controller is further capable of:
    voting the stored image of which the features are equal to the calculated features and comparing the result of the voting with a predetermined threshold value to judge whether or not the document image is similar to the stored image.

10. An image forming apparatus comprising:
  the image processing apparatus according to claim 1; and
  an image forming unit for forming an image processed by the image processing apparatus on a sheet.

11. The image forming apparatus according to claim 10, wherein
  in case of converting the document image to an electronic data of a predetermined format which is then stored, a mode of the processing is provided for reading the document image as conforming to the format.

12. An image processing system comprising:
  an image processing apparatus; and
  a server connected for communication with the image processing apparatus, wherein
  said image processing apparatus and the server comprise in a distributed manner:
    a storage section in which the description of an output process to be used for subjecting image data produced by reading a document image to an output process is stored in relation with a stored image;
    a determining section for determining from said image data whether or not said document image is similar to the stored image;
    a reading section for, when the determining section determines that the document image is similar to the stored image, reading from said storage section the description of the output process stored in relation with said stored image; and
    a control section for controlling the output process in accordance with the read out description of the output process,
  the image processing apparatus further comprising:
    a features storage section for storing features of stored images;
    a features calculating section for calculating features of the document image based on the obtained image data; and
    a comparator section for comparing between the calculated features and the features of the stored images, wherein
  said controller is further capable of:
    determining whether or not the document image is similar to the stored image based on the comparison by the comparator section, and
  the image processing apparatus further comprises:
    a region extracting section for extracting a plurality of regions composed of identical factors from said document image; and
    a centroid calculating section for calculating the centroid in each of the extracted regions, wherein the features of the document image are calculated based on the centroid.

13. A non-transitory computer readable recording medium storing thereon a computer program executable to perform the steps of:

storing a description of an output process used for subjecting image data obtained by reading a document image to an output process in relation with a preliminary stored image;

determining whether or not said document image is similar to the stored image based on the obtained image data;

when it is determined that the document image is similar to the stored image, reading the description of the output process stored in relation with the stored image from the storage section; and controlling the output process according to the read out description of the output process, the program further comprising the steps of:

storing features of stored images;

calculating features of the document image based on the obtained image data; and comparing between the calculated features and the features of the stored images, determining whether or not the document image is similar to the stored image based on the comparison, extracting a plurality of regions composed of identical factors from said document image; and calculating the centroid in each of the extracted regions, wherein the features of the document image are calculated based on the centroid.

14. An image processing apparatus comprising:

an output processing section for executing an output process based on an image data obtained by reading a document image;

a storage section in which a description of the output process to be executed by the output processing section is stored in relation with a stored image; and a controller capable of performing operations of:

determining whether or not the document image is similar to the preliminary stored image based on the obtained image data;

when determining that the image is similar to the stored image, reading out the description of the output process stored in relation with the stored image from said storage section;

controlling the output process to be executed by said output processing section in accordance with the read out description of the output process;

extracting a plurality of connected components representative of characters or graphics contained in the document image;

extracting feature points from the respective ones of the plurality of connected components thus extracted;

calculating a plurality of hash values based on an arrangement of the feature points thus extracted;

comparing the plurality of hash values thus calculated with hash values which are calculated with respect to registered images which are registered in advance;

voting for the registered image having the hash value which coincides with each of the hash values calculated with respect to the document image;

based on the voting result, judging the similarity between the document image and the registered image; and based on judging result, judging whether or not the document image coincides with the registered image.

* * * * *